United States Patent [19]

Tiemann et al.

[11] Patent Number: 4,533,960
[45] Date of Patent: Aug. 6, 1985

[54] SYSTEM FOR ENCODING AND DECODING VIDEO SIGNALS

[75] Inventors: Jerome J. Tiemann; Scott E. Cutler; Kenneth B. Welles, II, all of Schenectady, N.Y.

[73] Assignee: General Electric Company, Schenectady, N.Y.

[21] Appl. No.: 435,792

[22] Filed: Oct. 21, 1982

Related U.S. Application Data

[63] Continuation-in-part of Ser. No. 416,427, Sep. 9, 1982, abandoned.

[51] Int. Cl.³ .................... H04N 5/782; H04N 9/32
[52] U.S. Cl. .................................. 358/310; 358/12
[58] Field of Search .............. 358/310, 335, 12, 142, 358/285; 360/18

[56] References Cited

U.S. PATENT DOCUMENTS

| | | | |
|---|---|---|---|
| 3,700,793 | 10/1972 | Borsut et al. | 358/142 |
| 4,027,333 | 5/1977 | Kaiser et al. | 358/146 |
| 4,034,404 | 7/1977 | Nakagome et al. | 358/142 |
| 4,287,528 | 9/1981 | Levy | 358/142 X |
| 4,467,356 | 8/1984 | McCoy | 358/142 X |

OTHER PUBLICATIONS

Robert B. Dome, Spectrum Utilization in Color Television, Proc. IEEE, Oct. 1951, p. 1326.

Primary Examiner—Donald McElheny, Jr.
Attorney, Agent, or Firm—Marvin Snyder; James C. Davis, Jr.

[57] ABSTRACT

A system is described which makes use of the fact that in a raster scanned television system a high degree of correlation exists both in the luminance and in the chrominance signals of a pair of adjacent lines. Because of this correlation, the difference between the luminance signals of the two lines is usually much smaller than luminance signal of either line alone, and requires less bandwidth. The present invention takes advantage of the natural correlation in a television picture in the horizontal and vertical directions for bandwidth reduction without significant impairment of the reproduced picture. This is accomplished by processing the television signal for bandwidth reduction in particular ways and transmitting it entirely in the analog domain. The bandwidth requirement is reduced for the transmission of the video signals over a transmission channel such as a cable television channel, a broadcast channel or a storage medium.

19 Claims, 30 Drawing Figures

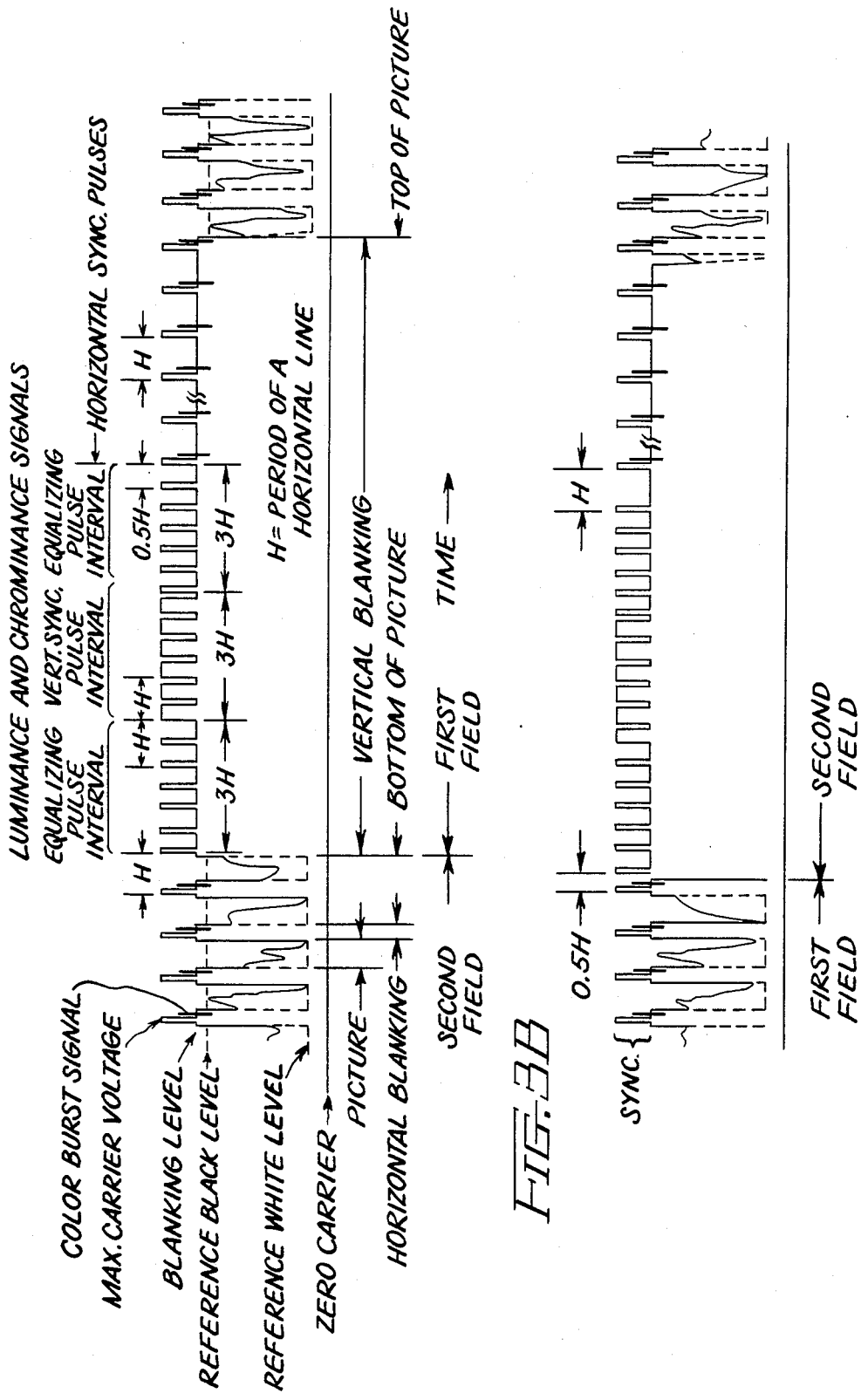

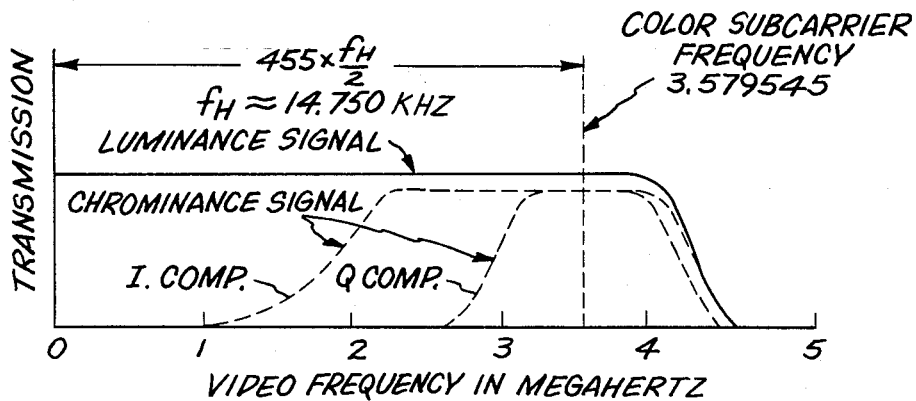
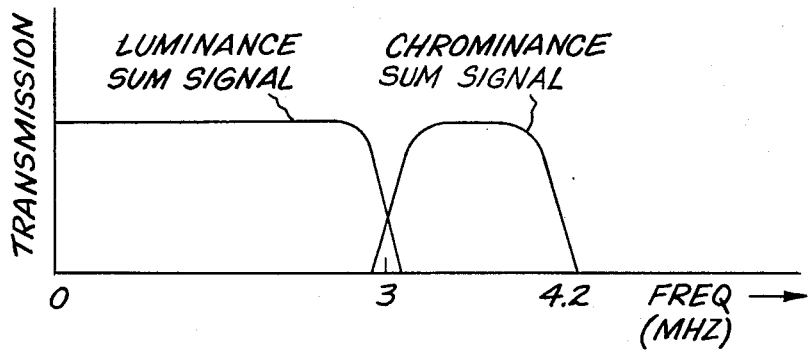
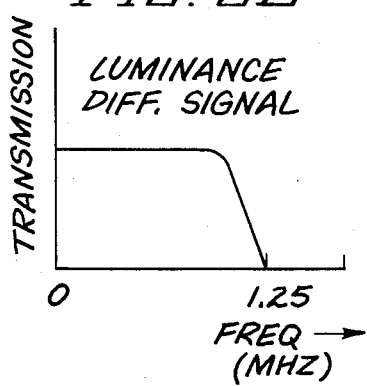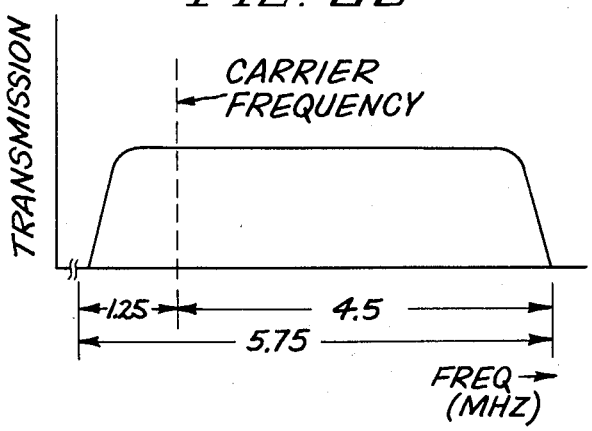

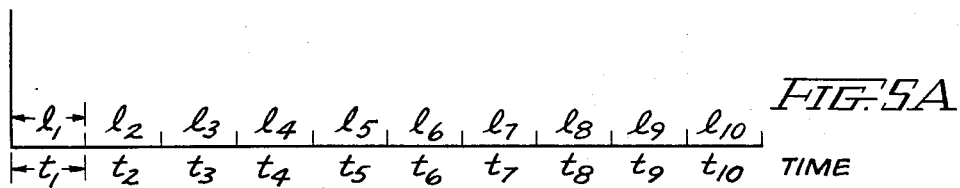
FIG. 5A  FIRST VIDEO SIGNAL
FIG. 5B  FIRST VIDEO SIGNAL DELAYED
FIG. 5C  FIRST COMPOSITE SIGNAL
FIG. 5D  SECOND COMPOSITE SIGNAL
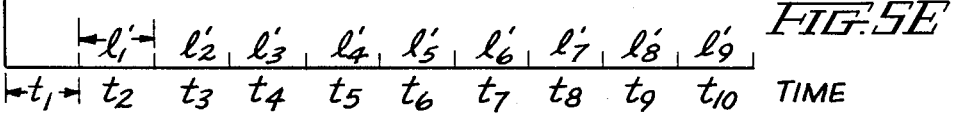
FIG. 5E  SECOND VIDEO SIGNAL
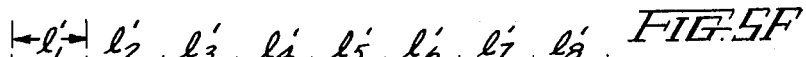
FIG. 5F  SECOND VIDEO SIGNAL DELAYED

H DRIVE

LINE 265 SIG

RESET

OUTPUT OF T.E. FLIP-FLOP

FRAME SYNC. SIGNAL

COMPARATOR OUTPUT

EDGE DETECTOR OUTPUT

FRAME SYNC. PULSE OUTPUT

4,533,960

SYSTEM FOR ENCODING AND DECODING VIDEO SIGNALS

This patent application is a continuation-in-part application of patent application Ser. No. 416,427, filed Sept. 9, 1982, now abandoned.

The present invention relates to a system for encoding and decoding video signals to reduce the bandwidth required for the transmission thereof over a transmission channel such as a cable television channel, a broadcast channel or a storage medium.

In a raster scanned television system, the correlation in the horizontal or raster scanned direction automatically results in a low bandwidth signal. Also, a high degree of correlation exists between lines in the vertical direction. Prior art systems of bandwidth reduction converted each pixel to a digital value of a predetermined number of bits with each pixel being assigned the same number of bits. Bandwidth was reduced by reducing the number of bits per pixel by relatively complex digital processes such as transform coding, adaptive differential pulse code modulation, etc. The resulting digital signal was transmitted in digital form. Such systems required large bandwidths, or with reduced bandwidth picture quality was impaired, unless relatively costly processing was utilized.

The present invention takes advantage of the natural correlation in a television picture in the horizontal and vertical directions for bandwidth reduction without significant impairment of the reproduced picture. This is accomplished by processing the television signal for bandwidth reduction in particular ways and transmitting it entirely in the analog domain.

An object of the present invention is to provide a bandwidth reduction system in which two video signals are passed simultaneously over a frequency channel having sufficient bandwidth to pass one video signal.

Another object of the present invention is to provide a two-to-one bandwidth reduction system in which the cost of delivering two video signals is only slightly greater than the cost of delivering a single video signal.

A further object of the present invention is to reformat a television signal so that it cannot be monitored by a conventional television receiver.

In carrying out the invention in a preferred embodiment thereof there is provided a first video signal comprising a plurality of successive lines having a line scanning frequency of a first predetermined value, said plurality of lines consisting of a first set of alternate lines and a second set of alternate lines, each line having a duration of a first predetermined time.

Means are provided for forming a plurality of lines of a first composite signal, said plurality of lines of said first composite signal consisting of first set of alternate lines and a second set of alternate lines, each line having a duration of said first predetermined time, each line of said first set of alternate lines of said first composite signal being the sum of a line of said first set of alternate lines of said first video signal delayed by said first predetermined time and a successive line of said second set of alternate lines of said first video signal, each line of said second set of alternate lines of said first composite signal being zero.

Means are provided for forming a plurality of lines of a second composite signal, said plurality of lines of said second composite signal consisting of lines of a first set of alternate lines and a second set of alternate lines, each line having a duration of said first predetermined time, each line of said first set of alternate lines of said second composite signal being the difference of a line of said first set of alternate lines of said first video signal delayed by said first predetermined time and a successive line of said second set of said first video signal, each line of said second set of alternate lines of said second composite signal being zero.

A second video signal is provided comprising a plurality of successive lines having a line scanning frequency of said first predetermined value, said plurality of lines consisting of a first set of alternate lines and a second set of alternate lines, each line having a duration of said first predetermined time.

Means are provided for forming a plurality of lines of a third composite signal, said plurality of lines of said third composite signal consisting of a first set of alternate lines and a second set of alternate lines, each line having a duration of said first predetermined time, each line of said first set of alternate lines of said third composite signal being the sum of a line of said first set of alternate lines of said second video signal delayed by said first predetermined time and a successive line of said second set of alternate lines of said second video signal, each line of said second set of said third composite signal being zero.

Means are provided for forming a plurality of lines of a fourth composite signal, said plurality of lines of said fourth composite signal consisting of a first set of alternate lines and a second set of alternate lines, each line having a duration of said first predetermined time, each line of said first set of alternate lines of said fourth composite signal being the difference of a line of said first set of alternate lines of said second video signal delayed by said first predetermined time and a successive line of said second set of alternate lines of said second video signal, each line of said second set of alternate lines of said fourth composite signal being zero.

Means are provided for interleaving the lines of said first set of alternate lines of said first composite signal and said first set of alternate lines of said third composite signal to provide a fifth composite signal. Means are provided for interleaving the lines of said first set of alternate lines of said second composite signal and said first set of alternate lines of said fourth composite signal to provide a sixth composite signal.

Means are provided for transmitting each of the lines of said fifth composite signal to a transmission channel. Means are provided for transmitting each of the lines of said sixth composite signal to said transmission channel.

Means are provided for recovering said fifth composite signal and said sixth composite signal from said transmission channel.

Means are provided for forming the sum of each line of a first set of alternate lines of said fifth composite signal and a respective line of said second set of alternate lines of said fifth composite signal to reconstitute a respective line of said first set of alternate lines of said first video signal.

Means are provided for forming the difference of each line of said first set of alternate lines of said fifth composite signal and a respective line of said second set of alternate lines of said fifth composite signal to reconstitute a respective line of said second set of alternate lines of said first video signal.

The features which are believed to be characteristic of the present invention are set forth with particularity in the appended claims. The invention itself, both as to its organization and method of operation, together with further objects and advantages thereof may best be understood by reference to the following description taken in connection with the accompanying drawings in which:

FIG. 3A is a diagram of the U.S. standard television signal showing the vertical blanking interval of the first field of a frame and the horizontal blanking and scanning lines prior to and subsequent to the vertical blanking interval. The diagram also shows horizontal synchronization pulses, vertical synchronization pulses, equalizing pulses, and color burst signals.

FIG. 3B is a diagram of the U.S. standard television signal showing the blanking interval of the second field of a frame and horizontal blanking and scanning lines prior to and subsequent to the vertical blanking interval. The diagram also shows horizontal synchronization pulses, vertical synchronization pulses, equalizing pulses, and color burst signals.

FIG. 4 shows a diagram of the bands of frequencies occupied by the luminance and chrominance components of a television signal in accordance with U.S. standards.

Figure 1:
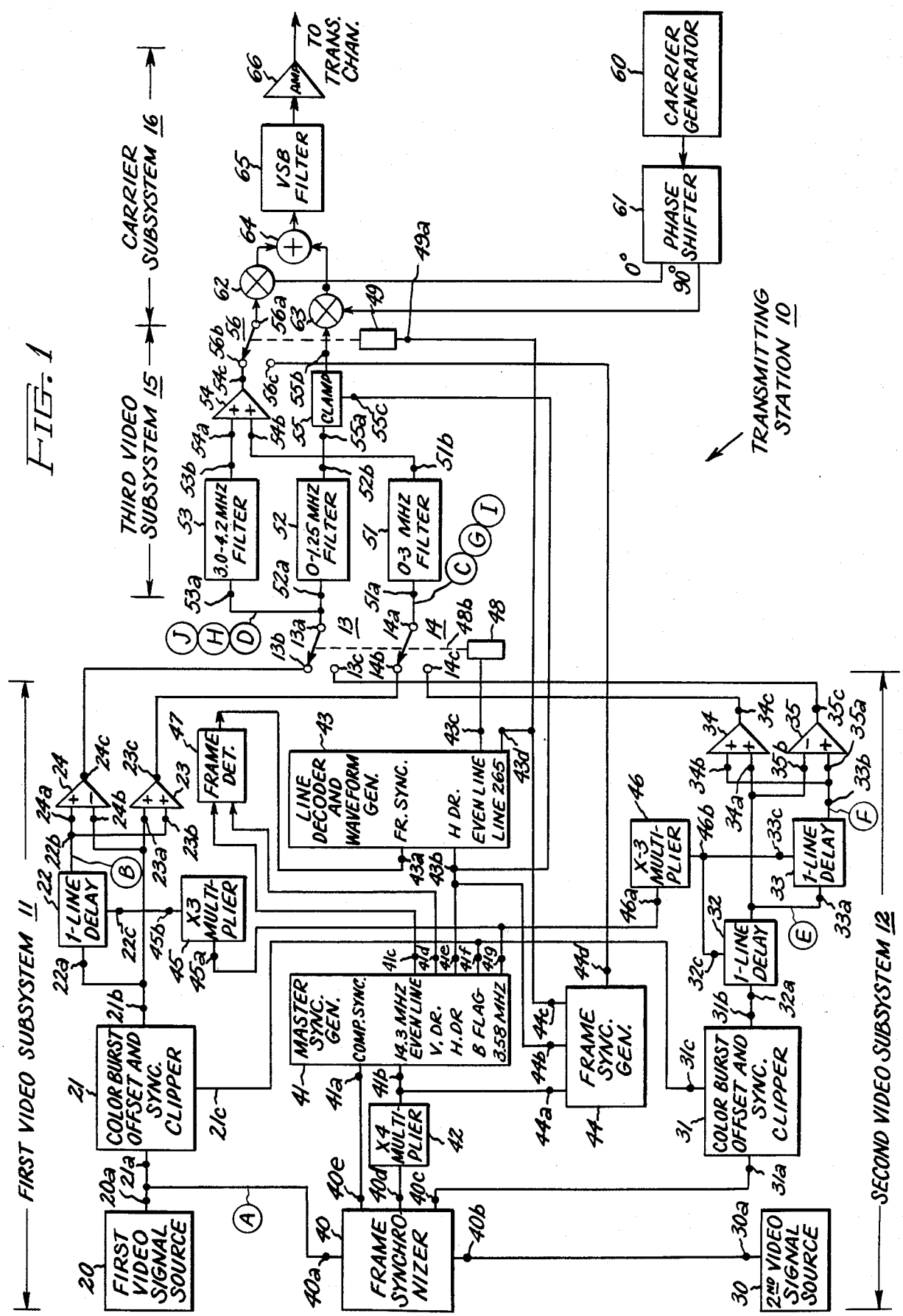
FIG. 1 shows a block diagram of apparatus for the processing of a first video signal and a second video, each including luminance and chrominance components into a resultant signal of a bandwidth comparable to the bandwidth of one of the video signals and for the transmission of the resultant signal over a transmission channel of bandwidth normally used for a single video signal.
Figure 2:
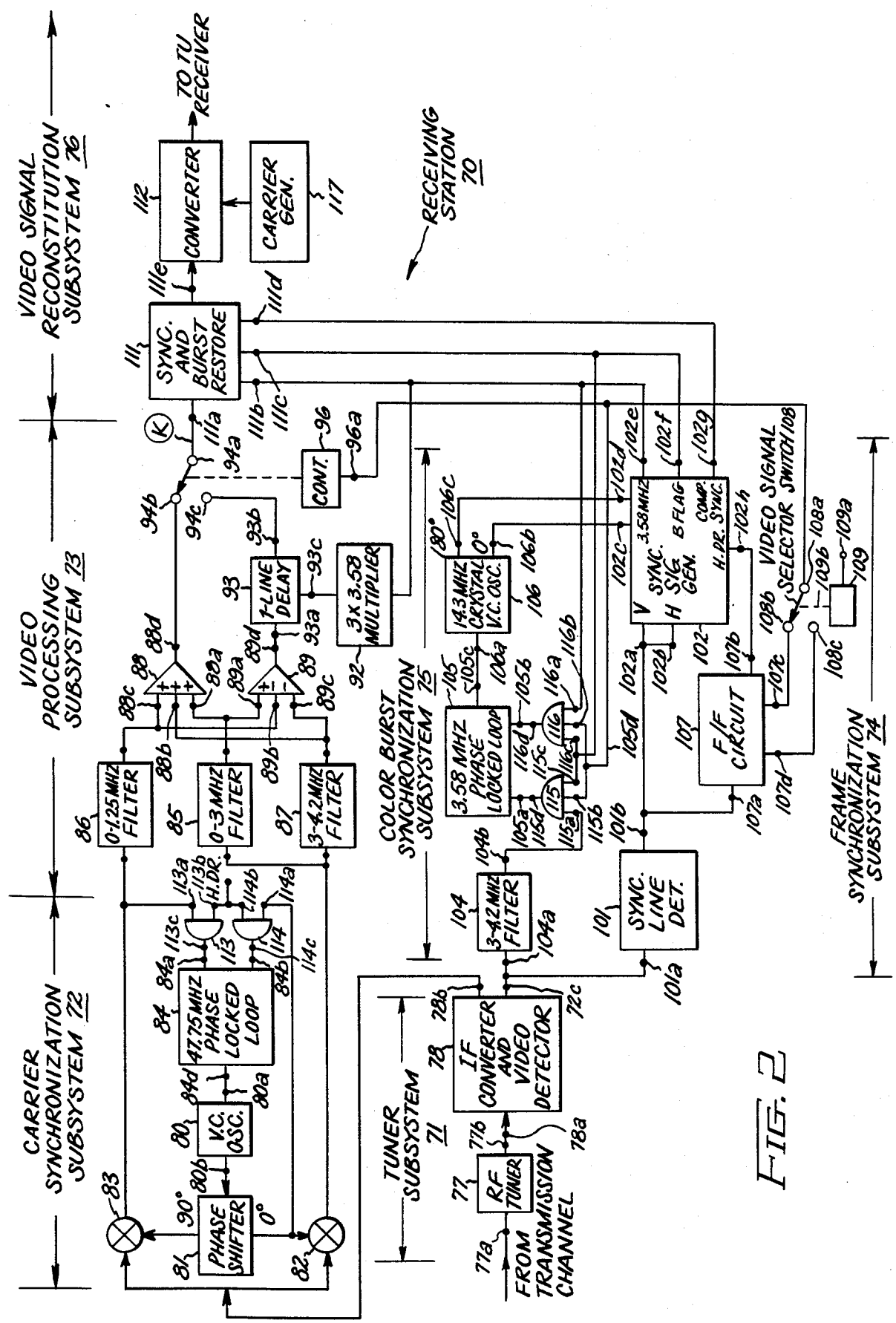
FIG. 2 shows a block diagram of apparatus for receiving the resultant signal from the transmission channel of the apparatus of FIG. 1 and for the processing thereof to reconstitute either one of the first and second video signals.

FIGS. 5A–5L are diagrams of the of video signals, drawn to a common time scale, occurring at various points in the apparatus of FIGS. 1 and 2. The point of occurrence of a signal of FIGS. 5A–5L in the block diagrams of FIGS. 1 and 2 is identified by a literal designation corresponding to the literal designation of the figure. The amplitude of each horizontal line of a first video signal to be processed is symbolically indicated by the designation 1 with a subscript to indicate the position of the line in the sequence of lines of a frame. The amplitude of each line of a second video signal to be processed is symbolically indicated by the designation 1' with a subscript to indicate the position of the line in the sequence of luminance lines of a frame.

FIG. 5A shows several consecutive lines, $l_1$–$l_{10}$, of the luminance component of a first video signal.

FIG. 5B shows the video signal of FIG. 5A delayed by a period of one line.

FIG. 5C shows the amplitude summation of successive non-overlapping pairs of lines utilizing the video signal of FIG. 5A and the video signal of FIG. 5B to provide a first composite signal. Successive lines are separated by a blank period equal to the period of a line.

FIG. 5D shows the amplitude difference of successive non-overlapping pairs of lines utilizing the video signal of FIG. 5A and the video signal of FIG. 5B to provide a second composite signal. Successive lines are separated by a blank period equal to the period of one line.

FIG. 5E shows several consecutive lines, $l'_1$–$l'_{10}$, of the luminance component of a second video signal. The second video signal is delayed in relation to the first video signal by the time of one line.

FIG. 5F shows the video signal of FIG. 5E delayed by a period of one line.

Figure 5G:
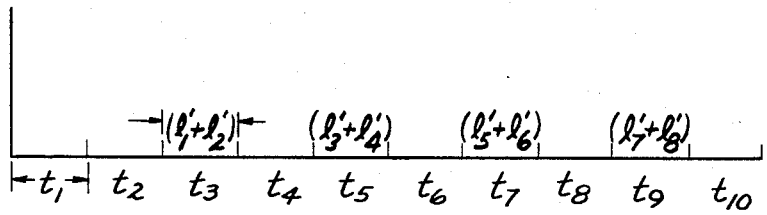

FIG. 5G shows the amplitude summation of successive overlapping pairs of lines utilizing the video signal of FIG. 5E and FIG. 5F to provide a third composite signal. Successive lines are separated by a blank period equal to the period of a line.

Figure 5H:
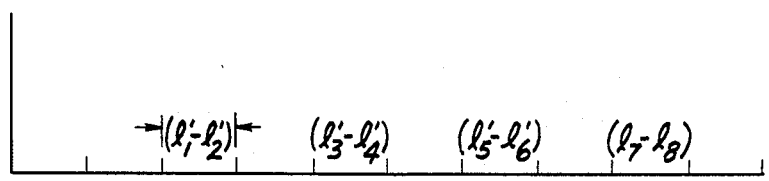

FIG. 5H shows the amplitude difference of successive overlapping pairs of lines utilizing the video signal of FIG. 5E and the video signal of FIG. 5F to provide a fourth composite signal. Successive lines are separated by a blank period equal to the period of one line.

Figure 5I:
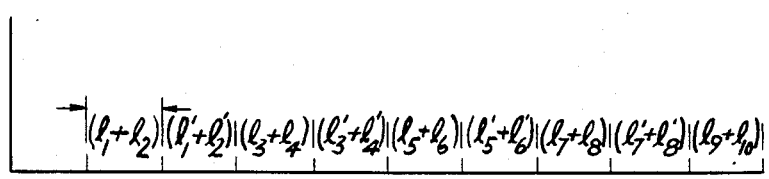

FIG. 5I shows a fifth composite signal obtained by combining the first composite signal of FIG. 5C and the third composite signal of FIG. 5G.

Figure 5J:
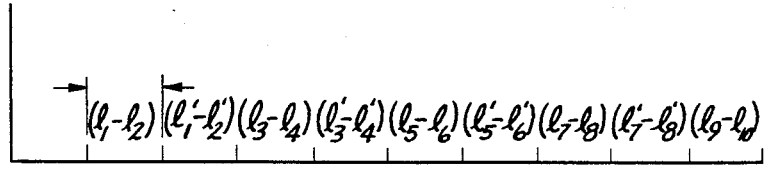

FIG. 5J shows a sixth composite signal obtained by combining the second composite signal of FIG. 5D and the fourth composite signal of FIG. 5H.

Figure 5K:
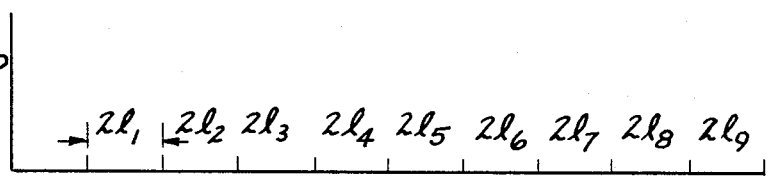

FIG. 5K shows the recovery of the first video signal of FIG. 5A, obtained by selectively processing the fifth composite signal of FIG. 5I and the sixth composite signal of FIG. 5J.

Figure 5L:
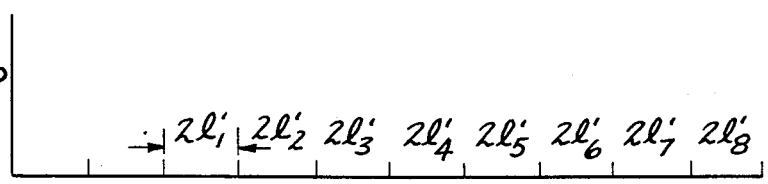

FIG. 5L shows the recovery of the second video signal of FIG. 5E, obtained by selectively processing the fifth composite signal of FIG. 5I and the sixth composite signal of FIG. 5J.

FIG. 6A shows a diagram of the bandwidth of the luminance sum signal and the chrominance sum signal of FIGS. 5I and 5J.

FIG. 6B shows a diagram of the bandwidth of the luminance difference signal of FIG. 5J.

FIG. 6C is a diagram of the response of the vestigial sideband filter of the transmission station of FIG. 1.

Figure 7:
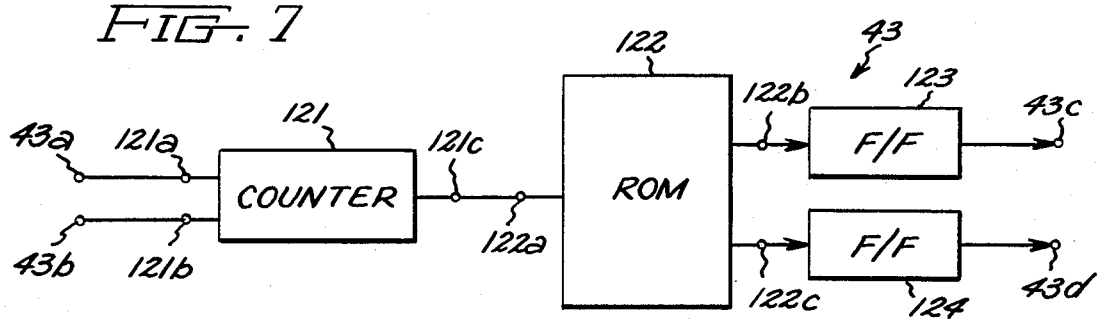

FIG. 7 is a block diagram of the line decoder and waveform generator of the transmission station of FIG. 1.

Figure 8:
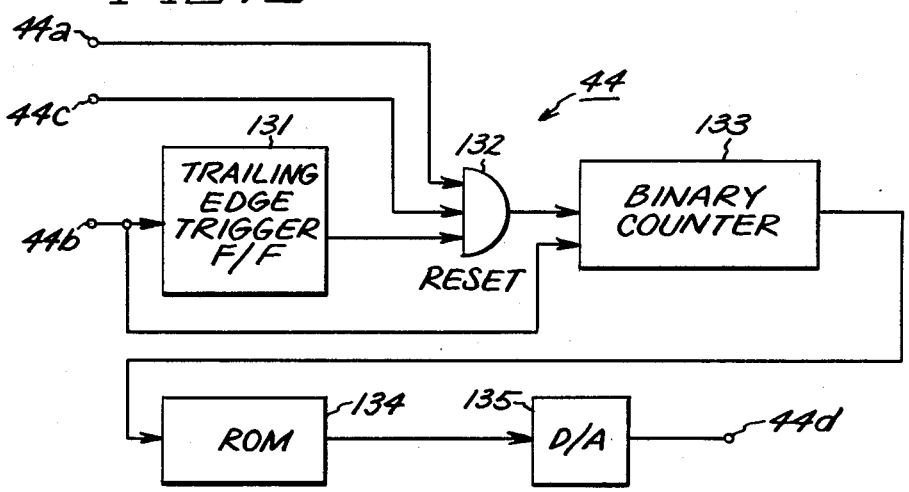

FIG. 8 is a block diagram of the frame sync generator of the transmission station of FIG. 1.

Figure 9:
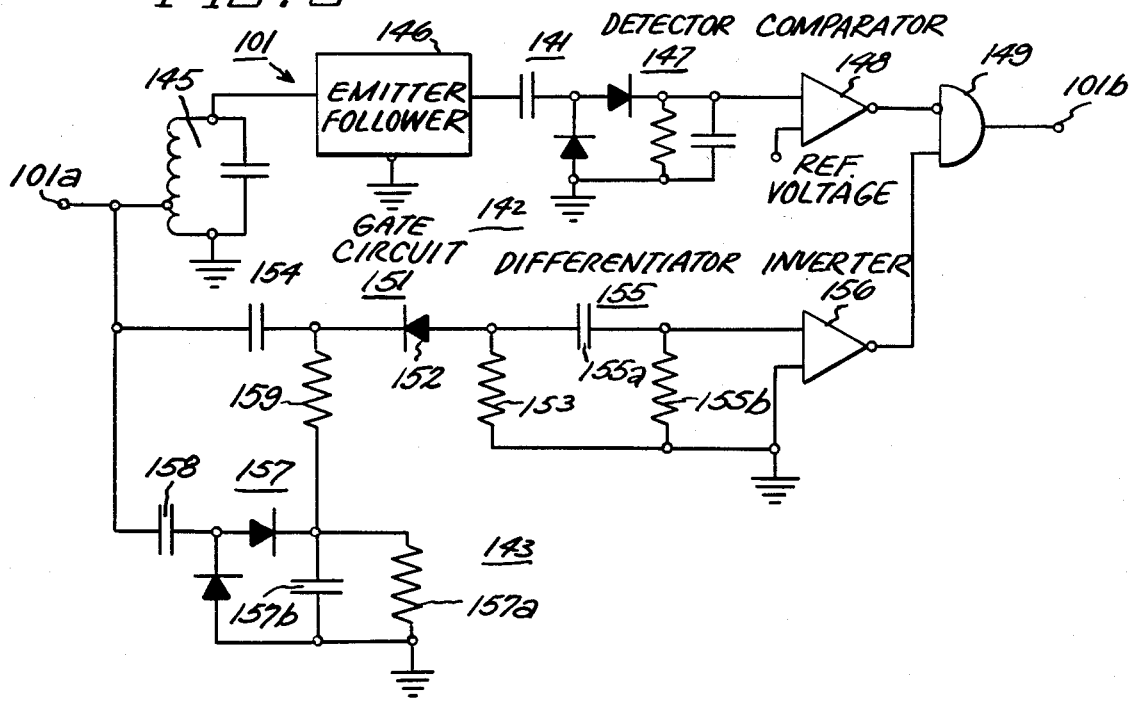

FIG. 9 is a circuit diagram of the sync line detector of the receiving station of FIG. 2.

FIGS. 10A–10G are diagrams of waveforms drawn to a common time scale useful in explaining the operation of the frame sync generator of FIG. 1 and the sync line detector of FIG. 2.

Referring now to FIG. 1, there is provided a transmitting station 10 including a first video subsystem 11 for processing a first video signal, a second video subsystem 12 for processing a second video signal, a pair of switches 13 and 14, a third video subsystem 15 for processing the video signals of video subsystems 11 and 12 combined by single pole-double throw switches 13 and 14, and a carrier subsystem 16 for encoding on a carrier the video signals processed by the third video subsystem 15. The first video system 11 includes a first video signal source 20 which provides at its output a standard color television or video signal, of the form shown in FIGS. 3A and 3B. The standard television signal includes horizontal synchronizing pulses, vertical synchronizing pulses, horizontal blanking pulses, vertical blanking pulses, color burst signals, and luminance and chrominance signals. Each frame of the television signal includes a pair of interlaced fields as shown in FIGS. 3A and 3B. FIG. 3A is a diagram of the standard television signal showing the vertical blanking interval of the first or odd field of a frame and also showing the horizontal blanking interval and the horizontal scanning lines prior to and subsequent to the vertical blanking interval.

FIG. 3B shows a diagram of the second or even field of the standard television signal showing the blanking interval of the second field of a frame and also showing the horizontal blanking interval and the scanning lines prior to and subsequent to the vertical blanking interval. FIG. 4 shows a diagram of the bands of frequencies occupied by the luminance and chrominance components of a complete color picture or video signal. The luminance component is contained in a band of frequencies extending from zero frequency to 4.5 MHz with cutoff at about 4.2 MHz. The frequencies of the luminance signal are centered about even multiplex of one-half of horizontal line scanning frequency. In order to represent both hue and saturation, the chrominance signal includes first and second independent components. Conventionally, these two components are called I and Q. The I component consists of sidebands of an in-phase or first color subcarrier modulated in amplitude by a first color signal which are contained in a band of frequencies from about 2 MHz to about 4.2 MHz. The first color signal is a first linear combination of red, green and blue color signals in accordance with U.S. color television standards. The Q component, consists of side bands of a second subcarrier in quadrature phase relationship to the first subcarrier modulated in amplitude by a second color signal which is contained in a band of frequencies from 3.0 MHz to 4.2 MHz approximately centered about the frequency of the subcarrier. The second color signal is a second linear combination of the red, green and blue color signals in accordance with U.S color television standards. The frequency of the color subcarrier is an odd multiple of one-half of the line scanning frequency of about 14.750 KHz.

The first video system 11 also includes a color burst offset and sync clipper circuit 21, a one-line delay circuit 22, a summation amplifier 23, and a differential amplifier 24. The color burst offset and sync clipper circuit 21 has an input terminal 21a, an output terminal 21b and a gating terminal 21c. In response to the television signal applied to its input terminal 21a, the color burst offset and sync clipper 21 recesses or shifts the level of the color burst signal below the horizontal blanking level and thereafter clips or removes the sync pulses from the television signal to provide a video signal at the output terminal 21b in which the horizontal and the vertical synchronizing pulses are detected to facilitate the processing of the color burst and video signals. The one-line delay circuit 22 is a charge coupled delay line having an input terminal 22a, an output terminal 22b and a clock terminal 22c. The summation amplifier 24 has a pair of input terminals 23a and 23b, and an output terminal 23c. The differential amplifier 24 has a noninverting terminal 24a, an inverting terminal 24b and an output terminal 24c.

The second video subsystem 12 includes a second video signal source 30 providing a standard color television signal at its output terminal 30a, a color burst offset and sync clipper circuit 31, a first one-line delay circuit 32, a second one-line delay circuit 33, a summation amplifier 34 and a differential amplifier 35. The color burst offset and sync clipper circuit 31 has an input terminal 31a, an output terminal 31b and a gating terminal 32c. In response to the television signal appearing at its input terminal 31a, the color burst offset and sync clipper recesses or shifts the level of the color burst signal below the horizontal blanking level and thereafter clips or removes the sync pulses from the television signal to provide a video signal at the output terminal 31b in which the horizontal and vertical synchronizing pulses are deleted to facilitate the processing of the color burst and video signals. The one line delay circuit 32 is a charge coupled delay line having an input terminal 32a, an output terminal 32b and a clocking terminal 32c. The one-line delay circuit 33 is also a charge coupled delay line having an input terminal 33a and an output terminal 33b and a clocking terminal 33c. The summation amplifier 34 has input terminals 34a and 34b and an output terminal 34c. The differential amplifier 35 has a noninverting input terminal 35a, an inverting input terminal 35b and a output terminal 35c. The switch 13 has a pole terminal 13a, a first contact terminal 13b and a second contact terminal 13c. The switch 14 has a pole terminal 14a, a first contact terminal 14b and a second contact terminal 14c.

The third video subsystem 15 includes a first filter 51, a second filter 52, a third filter 53, a summation amplifier 54, a clamp circuit 55, and a single pole-double throw switch 56. The first filter 51 has an input terminal 51a and an output terminal 51b and passes frequencies in the band from zero to 3 Mhz. The second filter 52 has an input terminal 52a and an output terminal 52b and passes frequencies in the band from zero to 1.25 Mhz. The third filter 53 has an input terminal 53a and an output terminal 53b and passes frequencies in the band from 3 MHz to 4.2 MHz. The summation amplifier 54 has an input terminal 54a, an input terminal 54b and an output terminal 54c. The clamp circuit 55 has an input terminal 55a, an output terminal 55b and a control terminal 55c. The clamp circuit 35 serves to limit the level of the signal applied to its input terminal to a predetermined value in response to a control signal applied to its control terminal 55c. The switch 56 has a pole terminal 56a, a first contact terminal 56b and a second contact terminal 56c.

The transmitting station 10 also includes frame synchronizer 40 having a first input terminal 40a, a second input terminal 40b and output terminals 40c, 40d and 40e. Frame synchronizer 40 functions in response to a first video signal applied to first input terminal 40a from source 20 and to a second video signal applied to second input terminal 40b to provide at the output terminal 40c the second video signal with the horizontal lines thereof in synchronism with the horizontal lines of the first video signal. In addition the frame synchronizer 40 provides at output terminal 40e the composite synchronizing signal of the first video signal from source 20 including the vertical synchronization and horizontal synchronization pulses and in addition it provides at output terminal 40d a subcarrier signal of 3.58 MHz obtained from the color burst signals of the first video signal. The frame synchronizer 40 is a standard component commercially available as Model 2525 from Microtime Company of Bloomfield, Conn.

The transmitting station also includes a master sync generator 41 which has input terminals 41a and 41b, and output terminals 41c, 41d, 41e, and 41f and a frequency multiplier 42. The multiplier 42 provides an output of 14.3 MHz in response to a 3.58 MHz signal applied to the input thereof from terminal 40d of frame synchronizer 40. In response to composite sync from terminal 40e of frame synchronizer 40 applied to input terminal 41a and a 14.3 MHz signal obtained from the output multiplier 42 and applied at terminal 41b, the master sync generator 41 provides at output terminals 41c through 41g, respectively, an even line of a frame signal, a vertical drive signal synchronized with the vertical sync pulses of the video signal of source 20. a horizontal drive signal synchronized with the horizontal synchronizing pulses of the video signal of source 20, a burst flag signal synchronized with the burst signal of the video signal of source 20 and a 3.58 MHz signal. Burst flag terminal 41f is connected to terminal 21c of color burst offset and sync clipper 21 and to terminal 31c of color burst offset and sync clipper 31 to control the operation thereof. The master sync generator 41 is a standard component commercially available as integrated circuit type 3262B TV Sync Generator from Fairchild, A Schlumberger Company, of Mountain View, California.

The transmitting station 10 also includes a line decoder and waveform generator 43 having input terminals 43a and 43b and having output terminals 43c and 43d and a frame detector 47 for developing a pulse at the output thereof coinciding with the beginning of a frame in response to vertical drive and even line signals from terminals 41c and 41d of master sync generator 41. In response to a signal from frame detector 47 applied to terminal 43a and horizontal drive pulses from master sync generator 41 applied to input terminal 43b, the line decoder and waveform generator 43 develops a signal at output terminal 43d coincident with the occurrence of line 265 of a frame of the video signal from source 20 and also develops at output terminal 43c a signal which alternates in level every line from a high level on the odd lines to a low level on the even lines of a frame. The line decoder and waveform generator 43 will be described in greater detail below in connection with FIG. 7.

The transmitting station also includes a frame sync generator 44 which has input terminals 44a, 44b and 44c and an output terminal 44d. In response to a 14.3 MHz signal obtained from frequency multiplier 42 and a horizontal drive signal obtained from terminal 41e of master sync generator and line 265 gating signal obtained from terminal 43d of the line decoder and waveform generator 43, the frame sync generator 44 develops at the output terminals 44d thereof a signal during the occurrence of line 265 of the first video signal from source 20 for signal processing at the receiving station 70 of FIG. 2 to be described below. The frame sync generator 44 will be described in greater detail below in connection with FIGS. 8, 10A-10G.

The transmitting station 10 also includes clocking pulse generators 45 and 46, switch controller 48 and switch controller 49. In response to a 3.58 MHz signal obtained from terminal 41g of master sync generator 41 and applied to input terminal 45a of clock pulse generator 45 clocking pulses of 3×3.58 MHz are obtained at the output terminal 45b thereof which are, in turn, applied to clocking terminal 22c of one-line delay circuit 22. Also, in response to a 3.58 MHz signal from master sync generator applied to input terminal 46a of clocking pulse generator 46, clocking pulses of 3×3.58 MHz are obtained at the output terminal 46b which are, in turn, applied to clocking terminal 32c of one-line delay circuit 32 and also to clocking terminal 33c of one-line delay circuit 33. The input of switch controller 48 is connected to terminal 43c of line decoder and waveform generator 43 and has a linkage indicated by dotted ine 48b linking the poles of switches 13 and 14 to control the position thereof. The input terminal 49a of controller 49 is connected to terminal 43d of line decoder and waveform generator 43 at which line 265 drive signal appears and has a linkage indicated by dotted line 49b connected to the pole of switch 56.

The output terminal 20a of the first video source 20 is connected to input terminal 40a of frame synchronizer 40 and also to input terminal 21a of color burst offset and sync clipper 21. The output terminal 21b of color burst offset and sync clipper 20 is connected to input terminal 22a of one-line delay circuit 22, to input terminal 23a of summation amplifier 23 and to inverting input terminal 24b of differential amplifier 24. The output terminal 22b of one-line delay circuit 22 is connected to input terminal 23b of summation amplifier 23 and to noninverting terminal 24a of differential amplifier 24. The output terminal 23c of summation amplifier 23 is connected to contact terminal 14b of switch 14. The output terminal 24c of differential amplifier 24 is connected to contact terminal 13b of switch 13.

The output terminal 30a of second video signal source 30 is connected to input terminal 40b of frame synchronizer 40. Output terminal 40c of frame synchronizer 40 is connected to input terminal 31a of color burst offset and sync clipper 31. The output terminal 31b is connected to input terminal 32a of one line delay circuit 32. The output terminal 32b of one line delay circuit 32 is connected to terminal 34a of summation amplifier 34, to inverting terminal 35b of differential amplifier 35, and to input terminal 33a of one line delay circuit 33. The output terminal 33b of one-line delay circuit 33 is connected to input terminal 34b of summation amplifier 34 and to noninverting terminal 35a of differential amplifier 35. The output of summation amplifier 35c is connected to contact terminal 14c of switch 14. The output terminal 35c of differential amplifier 35 is connected to contact terminal 13c of switch 13.

Pole terminal 13a of switch 13 is connected to input terminal 53a of filter 53 and to input terminal 52a of filter 52. The pole terminal 14a of switch 14 is connected to input terminal 51a of filter 51. The output terminal of filter 53 is connected to input terminal 54a of summation amplifier 54. The output terminal 51b of filter 51 is connected to input terminal 54b of summation amplifier 54. The output terminal 52b of filter 52 is connected to input terminal 55a of clamp 55. The output terminal 54c of summation amplifier 54 is connected to contact terminal 56b. Output terminal 44d of frame sync generator 44 is connected to contact terminal 56c.

The operation of the transmitting station 10 of FIG. 1 will now be described in connection with FIGS. 5A-5J which show diagrams of video signals drawn to a common time scale and occurring at various points in the apparatus of FIG. 1. The point of occurrence of a signal of FIGS. 5A-5J in the block diagram of FIG. 1 is identified by a literal designation corresponding to the literal designation of the figure. The amplitude of each line of the first video signal to be processed is symbolically indicated by the letter l with a subscript to indicate the position of the line in the sequence of lines of a frame. The amplitude of each line of the second video signal to be processed is symbolically indicated by the letter l' with a subscript to indicate the position of the line in the sequence of lines of a frame. The video signal appearing at terminal 20a at the output of the first video source 20 is shown in FIG. 5A. FIG. 5A shows several consecutive lines, $l_1$ through $l_{10}$ of the first video signal. The lines $l_1$, $l_3$, $l_5$, $l_7$, $l_9$, etc. form a first set of alternate lines. The lines $l_2$, $l_4$, $l_6$, $l_8$, $l_{10}$, etc. form a second set of alternate lines. Each of the lines of the first video signal has the color burst signal thereof offset or recessed and the horizontal sync pulses thereof clipped by the color burst offset and sync clipper 21. The video signal is then delayed by a period of one line by the one-line delay circuit 22, as shown in FIG. 5B. The delayed signal of FIG. 5B is applied to one terminal 23b of summation amplifier 23 and also to the noninverting terminal 24a of the differential amplifier 24. The undelayed video signal shown in FIG. 5A is applied to the other terminal 23a of the summation amplifier 23 and also to the other terminal 24b of the differential amplifier. Thus, at the output terminal 23c of the summation amplifier 23, a signal is obtained which is the sum of successive pairs of lines of the first video signal and similarly at the output terminal 24c of the differential amplifier 24 a video signal is obtained which is the difference of successive pairs of lines. The sequence of sums would be $l_1+l_2$, $l_2+l_3$, $l_3+l_4$, etc. and similarly the sequence of differences would be $l_1-l_2$, $l_2-l_3$, $l_3-l_4$, etc. In accordance with the present invention, the sequences $l_1+l_2$, $l_3+l_4$, $l_5+l_6$, etc. and also the sequence of $l_1-l_2$, $l_3-l_4$, $l_5-l_6$, etc. are utilized. This is accomplished by operating the pole of the switch 14 so that it makes contact with the contact terminal 14b during the interval $t_2$, $t_4$, $t_6$ etc., of the lines $l_2$, $l_4$, $l_6$ etc., respectively. Thus, at the pole terminal 14a of switch 14, a video signal, referred to as a first composite signal appears having the amplitude $l_1+l_2$ at time $t_2$, $l_3+l_4$ at time $t_4$, $l_5+l_6$ at time $t_6$, etc. as shown in FIG. 5C. Similarly, the pole of switch 13 is operated so that the pole of switch 13 makes contact with contact terminal 13b during the time of occurrence of lines $l_2$, $l_4$, $l_6$, etc. at times $t_2$, $t_4$, $t_6$, etc., respectively. Thus at the pole terminal 13a of switch 13, a video signal, referred to as the second composite signal, appears having amplitude $l_1-l_2$ at time $t_2$, $l_3-l_4$ at time $t_4$, $l_5-l_6$ at time $t_6$, etc. as shown in FIG. 5D. These results are obtained by the action of the controller 48 which alternates the position of the poles of switches 13 and 14, between a first contact position and a second contact position in response to the control signal obtained from terminal 43c of the line decoder and waveform generator 43.

The second video signal from the second video signal source 30 is applied to the input terminal 40b of the frame synchronizer 40 which synchronizes the horizontal lines of the second video signal with the lines of the first video signal. The output of the frame synchronizer 40 is applied to the color burst offset and sync clipper 31 which offsets the color burst signal to a level below the level of horizontal blanking and thereafter clips the horizontal and the vertical pulses to provide at the output thereof the second video signal with the horizontal sync pulses removed and the color burst offset in level therein. The second video signal shown in FIG. 5E is delayed by the period of one line by the one line delay circuit 32 so that line $l_1'$ thereof occurs at time $t_2$, that is, during the time of occurrence of line $l_2$ of the first video signal and line $l_2'$ occurs during time $t_3$, $l_3'$ occurs during time $t_4$, etc. The delayed signal of FIG. 5E is applied to one terminal 34a of summation amplifier 34, to one terminal 33a of one-line delay circuit 33 and to the inverting terminal 35b of differential amplifier 35. The output of the one line delay circuit 33 is connected to input terminal 34b of summation amplifier 34 and to the noninverting terminal 35a of differential amplifier 35. Thus, at the output of the summation amplifier 34, a signal is obtained which is the sum of successive pairs of lines of the video signal and similarly at the output terminal of the differential amplifier 35 a video signal is obtained which is the difference of successive pairs of lines. The sequence of sums would be $l_1'+l_2'$, $l_2'+l_3'$, $l_3'+l_4'$, etc. and similarly the sequence of the difference of the two lines would be $l_1'-l_2'$, $l_2'-l_3'$, $l_3'-l_4'$, etc. In accordance with the present invention, the sequence of $l_1'+l_2'$, $l_3'+l_4'$, $l_5'+l_6'$, etc. and also the sequence of $l_1'-l_2'$, $l_3'-l_4'$, $l_5'-l_6'$, etc. are utilized. As mentioned above, during the intervals $t_2$, $t_4$, $t_6$, etc. the poles of switches 13 and 14 contact the first contact terminals 13b and 14b, respectively, of switches 13 and 14. Accordingly, during these times no signal from the output of the summation amplifier 34 and the difference amplifier 35 appear at the pole terminals 13a and 14a of the switches 13 and 14. During times $t_1$, $t_3$, $t_5$, $t_7$, the pole terminals of the switches 13 and 14 contact the second terminals 13c and 14c, respectively, of switches 13 and 14. Accordingly, at these times a video signal appears at the output of the summation amplifier 34 and also at pole terminal 14a of switch 14 as shown in FIG. 5G and referred to as a third composite signal. The signal $l_1'+l_2'$ occurs during time $t_3$, and is blank during time $t_4$. The signal $l_3'+l_4'$ appears during time $t_5$, and is blank during time $t_6$. The signal $l_5'+l_6'$ appears at time $t_7$, and is blank during time $t_8$, etc. Also, during the time periods $t_3$, $t_5$, $t_7$, etc., the output of the differential amplifier 35 appears at the pole terminal 13a of switch 13 as shown in FIG. 5H and referred to as a fourth composite signal. During time $t_3$, the difference signal $l_1'-l_2'$ appears, and is blank during time $t_4$. The difference signal $l_3'-l_4'$ appears during time $t_5$, and is blank during time $t_6$. The difference signal $l_5'-l_6'$ appears during the time $t_7$, and is blank during time $t_8$, etc. Thus, at the pole terminal 14a of switch 14, appears the summation signal shown in FIG. 5I. The sequence of FIG. 5I is $l_1+l_2$, $l_1'+l_2'$, $l_3+l_4$, $l_3'$, $l_4'$, etc. occurring at times $t_2$, $t_3$, $t_4$, etc., respectively. The video signal appearing at the pole terminal 13a of switch 13 is shown in FIG. 5J. The sequence is $l_1-l_2$, $l_1'-l_2'$, $l_3-l_4$, $l_3'-l_4'$, etc. occuring at times $t_2$, $t_3$, $t_4$, $t_5$, etc., respectively.

Thus, at terminal 14a of switch 14, appears a composite video signal, referred to as a fifth composite signal, consisting of sums of pairs of lines of the first video signal interleaved with sums of the pair of lines of the second video signal. As the color subcarrier is an odd harmonic of one-half of the line scanning frequency, the side bands of the color subcarrier containing the chrominance information occur at odd harmonics of the line scanning frequency. Hence, they are canceled by the summation amplifiers 23 and 34 and thus only the luminance components of the first and second video signals appears at terminal 14a. The luminance signal is limited to frequencies less than 3 MHz by the low pass filter 51, as shown in FIG. 6A. The output of the low pass filter 51, referred to as the seventh composite signal, is applied to input terminal 54b of summation amplifier 54. Also, at pole terminal 13a, a composite video signal, referred to as the sixth composite signal, appears including luminance components from each of the first and second video signals which are differences of adjacent pairs of lines. As the color side bands occur at odd harmonics of one half of the line scanning frequency, the side band signals appearing on a pair of adjacent lines are added in the subtraction process. Thus, both a luminance difference signal and a color side band summation signal appears at this terminal. The luminance signal is limited by the low pass filter 52 to frequencies less than 1.25 MHz as shown in FIG. 6B. The output of the filter 52, referred to as the eighth composite signal, is applied to a clamp 35 at the output of which appears the difference signal in which during a portion of each line a signal of predetermined reference is inserted for reasons to be described in greater detail below for synchronization of the phase of a carrier at the receiver with the phase the carrier at the transmitter to enable synchronous demoulation at the receiver. The signal appearing at the pole terminal 13a is filtered by the bandpass filter 53 to pass frequencies in the range of 3.0 to 4.2 MHz, as shown in FIG. 6A, to remove the color subcarrier sideband signals consisting of the sum of the color subcarrier side band signals of two adjacent lines. The output of filter 53, referred to as the ninth composite signal, is applied to the input terminal 54a of the summation amplifier 54 at the output terminal of which is obtained a signal referred to as the tenth composite signal. The output terminal 54c of the summation amplifier is connected to contact terminal 56b of switch 56. Thus at the contact terminal 56b of switch 56 appears the luminance component of the video signals limited to the band of 0–3 MHz and the color subcarrier sideband components limited to the band of 3 MHz-4.2 MHz. The pole of switch 56 is actuated by controller 49 over linkage 49c to maintain the pole thereof contacting terminal 56b during all 525 lines of a frame except line number 265. In response to a signal obtained from the line decoder and waveform generator 43 during line number 265, the pole of switch 26 is moved to contact terminal 56c to which is applied a frame synchronization signal from frame sync generator 44. Thus, during line number 265 of each frame, a frame synchronization signal appears. The combined signal appears at the pole terminal 56a of the switch 56. The synchronization signal on line number 265 is utilized to synchronize the frames at the receiving station for decoding the first and second video signals from the composite signal transmitted thereto as will be described below.

The carrier subsystem 16 of the transmitting station 10 includes a carrier generator 60, a quadrature phase shifter 61, a first modulator 62, a second modulator 63, a combiner 64, a vestigial side band filter 65 and an amplifier 66. The carrier generated by the carrier generator 60 is applied to the quadrature shifter 61 at the output terminals of which appear a carrier wave of zero reference phase and a carrier wave shifted in phase by 90 degrees with respect to reference phase. The composite video signal appearing at pole terminal 56a, referred to as the tenth composite signal, is applied to one input terminal of modulator 62, to the other terminal of which the zero phae carrier wave is applied. Thus, at the output of the first modulator 62, is obtained a carrier wave of zero reference phase modulated in amplitude by the tenth composite signal. The signal appearing at the output of the clamp 35 referred to as the eighth composite signal is applied to one terminal of the second modulator 63, to the other terminal of which is applied the carrier wave the phase of which is shifted by 90 degrees from the phase of the zero reference phase carrier wave to provide at the output of the modulator 63 a carrier wave modulated in amplitude by the tenth composite video signal. The outputs of the modulators 62 and 63 are combined in the combiner 64 at the output of which appears a carrier wave one phase of which is modulated in amplitude by the eighth composite signal, the other or quadrature phase of which is modulated in amplitude by the tenth composite video signal. After filtering by the vestigial side band filter 65, the response of which is shown in FIG. 6C, the modulated carrier wave is amplified by amplifier 66 and thereafter applied to a suitable transmission channel such as a transmission line or a television channel for reception at a suitable receiving station. Any other technique whereby a single carrier is modulated by two independent signals is acceptable, for example, a modulation method in which the carrier amplitude is modulated by a first signal while the phase is modulated by the second signal.

Referring to FIG. 2, the receiving station 70 includes a tuner subsystem 71, a carrier synchronization subsystem 72, a video processing subsystem 73, a color burst synchronization subsystem 74, a frame synchronization subsystem 75 and a video signal reconstitution subsystem 76. The tuner subsystem 71 comprises a RF tuner 77 having an input terminal 77a and an output terminal 77b, and an IF converter and video detector 78 having an input terminal 78a and an output terminals 78b and 78c.

The input terminal 77a of the tuner 77 is coupled to the transmission channel. At the output terminal 77b is obtained a carrier wave modulated by the desired composite video signals. The IF converter and video detector 78 in response to the modulated carrier wave applied to its input terminal 78a develops at output terminal 78b a modulated carrier wave of IF carrier frequency, the same as the carrier frequency generated by carrier generator 60 of the transmitting station 10 of FIG. 1, and at output terminal 78c a demodulated video signal.

The carrier synchronization subsystem 72 functions to generate an IF carrier identical in frequency and phase to the frequency and phase of the IF carrier of generator 60 and utilizes the generated IF carrier to demodulate the eighth composite video signal and the tenth composite video signal encoded onto the IF carrier at the transmission station. The carrier synchronization subsystem 72 includes a voltage controlled oscillator 80, a phase shifter 81, a first synchronous demodulator 82, a second synchronous demodulator 83, a phase locked loop 84 and AND gates 113 and 114. The voltage controlled oscillator 80 has a control terminal 80a and an output terminal 80b. Oscillator 80 provides at terminal 80b an output of IF carrier frequency and a phase which is dependent on the control voltage applied to the control terminal 80a. The quadrature phase shifter 81 shifts the phase of the output 90 degrees from the phase of the output of the voltage controlled oscillator 80 and provides an output of zero degrees reference phase and an output that is shifted 90 degrees with respect to reference phase. The output of zero degree reference phase is applied to the first demodulator 82 and the output shifted in phase by 90 degrees is applied to the second demodulator 83. The IF signal from the output terminal 78b of the IF converter 78 is applied to an input of the first demodulator 82 and to an input of the second demodulator 83. At the output of the first demodulator 82 is obtained the tenth composite video signal which was encoded on the carrier of zero reference phase at the transmission station. At the output of the second demodulator 83 is obtained the eighth composite video signal which was encoded on the carrier shifted in phase by 90 degrees at the transmission station. As described in connection with FIG. 1 encoded on each line of the eighth composite signal during the horizontal drive interval is a reference signal of a predetermined reference level. Thus, during this interval of time only unmodulated RF carrier of zero degrees reference phase appears at the output of amplifier 66. The phase locked loop 84 includes input terminals 84a and 84b and output terminal 84c. The AND gate 113 includes input terminals 113a and 113b and output terminal 113c. The AND gate 114 includes input terminals 114a and 114b and output terminal 114c. The outut of demodulator 83 is connected to input terminal 113a of AND gate 113. The output of zero reference phase of phase shifter 81 is connected to input terminal 114a of AND gate 114. The input terminals 113b and 114b of AND gates 113 and 114 are connected to terminal 102h of sync signal generator 102 at which a horizontal drive signal is obtained as will be described below. The output terminal 113c of AND gate 113 is connected to input terminal 84a of phase locked loop 84. The output terminal 114c of AND gate 114 is connected to input terminal 84b of phase locked loop 84. The output terminal 84c is connected to control terminal 84a of voltage controlled oscillator 80. During the horizontal drive interval the carrier signal from the output of the demodulator 83 and the output of zero reference phase of the voltage controlled oscillator 80 are gated by AND gates 113 and 114 into the phase locked loop 84 and their phases compared. If the phase of the output of the phase shifter 81 appearing at terminal 114a of AND gate 114 departs in one direction from the phase of the carrier appearing at terminal 113a of AND gate 113, an output signal of one polarity is developed at the output terminal 84c of the phase locked loop 84. If a departure in phase of the output of the oscillator 84 is in the other direction, a signal of the opposite polarity is developed at the output terminal 84c of the phase locked loop 84. Thus, in response to the output from the phase locked loop 84, the voltage controlled oscillator 80 is caused to maintain its phase in correspondence with the phase of the carrier wave of the carrier generator 60 at the transmission station. Thus, at the output of the first demodulator 82 is obtained the tenth composite video signal and at the output of the second demodulator 83 is obtained the eighth composite video signal. The phase locked loop circuit 84 is a standard component commercially available as Integrated Circuit Type 5814 TV Synthesizer from National Semiconductor Corporation of Santa Clara, California.

The video processing subsystem 73 includes a low pass filter 85 for passing frequencies up to 3 MHz, a low pass filter 86 for passing frequencies up to 1.25 MHz and a bandpass filter 87 for passing frequencies in the band of 3 MHz to 4.2 MHz, a summation amplifier 88 having input terminals 88a, 88b and 88c and an output terminal 88d, a differential amplifier 89 having a noninverting input terminal 89a, an inverting input terminal 89b, an inverting input terminal 89c and an output terminal 89d, a clock delay line 93 having an input terminal 93a, an output terminal 93b and a clocking terminal 93c and a switch 94 having a pole terminal 94a, a first contact terminal 94b and a second contact terminal 94c. The output of the demodulator 82 which is the tenth composite video signal is applied to the filter 85 thereby recovering the seventh composite signal at the output terminal thereof. The output of the demodulator 82 is also applied to the input of the filter 87 thereby recovering the ninth composite signal at the output terminal thereof. The output from the demodulator 83 which is the eighth composite signal is applied to the input of filter 86 thereby recovering at its output terminal the eighth composite signal. The outputs of filters 85, 86 and 87 are applied to terminals 88a, 88c and 88b of amplifier 88, respectively. The outputs of filters 85, 86 and 87 are also applied to input terminals 89a, 89b and 89c of differential amplifier 89, respectively. The output of the filter 85 is the seventh composite signal or the fifth composite signal of FIG. 5I filtered. The output of the filter 86 is the eighth composite video signal or the sixth composite signal of FIG. 5J filtered. The output of the filter 87 is the ninth composite video signal which includes the chrominance components of the first and second video signals filtered. The summation amplifier 88 adds the outputs of the filters 85, 86, and 87. Thus, during time $t_2$ the lines $(l_1+l_2)$ and $(l_1-l_2)$ are added to obtain line $l_1$ of the seventh composite signal. In addition, the chrominance component is also obtained during this interval of time. The difference amplifier 81 subtracts the lines $(l_1+l_2)$ and $(l_1-l_2)$ during the time $t_2$ to obtain line $l_2$ of the seventh video signal. The output of the summation amplifier 88 is applied to first contact terminal 94b of switch 94. The output of the differential amplifier 89a is applied to the input of one-line delay circuit, the output of which is connected to second contact terminal 94c of switch 94. Thus, the signal at contact terminal 94c is delayed by one line by the delay line 93. In response to a control signal from terminal 108a of switch 108, the switch control element 96 causes the pole of switch 94 to alternate between contact with terminal 94b and 94c in synchronism with the line scanning frequency. During time $t_2$, the pole of switch 94 contacts terminal 94b and during time $t_3$, the pole of switch 94 contacts terminal 94c and so on. Thus, at the pole terminal 94a of switch 94 is obtained first line $l_1$ of the first video signal during time $t_2$, followed by line $l_2$ during time $t_3$, then line $l_3$ during time $t_4$, etc. The chroma signal appearing at the output of the filter 87 is applied to the inverting terminal 89c of the differential amplifier 89. Thus, at the output thereof the inverted chrominance signal is reinverted so that it is out of phase with the chroma signal appearing at the output of the summation amplifier 88 and of the same amplitude, as desired in the reconstituted video signal.

At the output of summation amplifier 88 is obtained a signal consisting of a first set of alternate lines of the first video signal of FIG. 5A interleaved with a first set of alternate lines of the second video signal of FIG. 5E. At the output of differential amplifier 89 is obtained a signal consisting of a second set of alternate lines of the first video signal of FIG. 5A interleaved with a second set of alternate lines of the second video signal. The one-line delay circuit 93 delays the latter signal. The switch 94 shifting between a first position and a second position at line rate combines the first set of alternate lines with the second set of alternate lines of either the first or second video signals, depending on the phasing of the switch 94.

The frame synchronization subsystem 74 includes synchronization line detector 101 and synchronization signal generator 102. The sync line detector 101 has an input terminal 101a and an output terminal 101b. Input terminal 101a is connected to video terminal 78c of IF converter and video detector 78. The sync line detector 101 detects the line of a frame which is encoded with the frame sync signal and provides an output at terminal 101b. The sync line detector 101 will be described below in greater detail in connection with FIGS. 9 and 10E-10G.

The sync signal generator 102 includes a vertical synchronization input terminal 102a and a horizontal synchronization input terminal 102b which are connected to output terminal 101b of sync line detector 101, and input terminals 102c and 102d to which zero degree and 180 degree reference 14.3 MHz signal from local oscillator 106 are applied, respectively. The sync signal generator 102 also includes output terminals 102e, 102f, 102g and 102h. A 3.58 MHz signal of color burst signal of reference phase is obtained at terminal 102e. In response to a 3.58 MHz signal obtained from terminal 102e of sync signal generator 102 and applied to the input of clock pulse generator 92 clocking pulses of $3\times3.58$ MHz are obtained at the output thereof which are, in turn, applied to clocking terminal 93c of one-line delay circuit 93. A burst flag signal is obtained at terminal 102f for gating phase locked loop 105 of color burst synchronization subsystem 75. A composite sync signal comprising horizontal synchronization pulses and vertical synchronization signal pulses is obtained at terminal 102g. Horizontal drive pulses are obtained at terminal 102h. The sync signal generator 102 is a standard component and is commercially available as Integrated Circuit No. 3262B TV Sync Generator from Fairchild, A Schlumberger Company, of Mountain View, California.

The color burst signal subsystems 75 includes a bandpass filter 104 having an input terminal 104a and an output terminal 104b for filtering frequencies in the pass band of 3 MHz to 4.2 MHz to recover the 3.58 color burst signals encoded on each line of the detected video signal. One set of alternate lines of the video signal would include the color burst signal from the first video signal from source 20 and each of the other set of alternate lines would include the color burst signal from the second video signal from source 30. The color burst synchronization subsystem 75 also includes a phase locked loop circuit 105, an AND gate 115 and an AND gate 116, a crystal controlled, voltage controlled oscillator 106 and a flip-flop circuit 107. The 3.58 MHz phase locked loop includes input terminals 105a and 105b and an output terminal 105c. The AND gate 115 includes input terminals 115a, 115b and 115c and output terminal 115d. The AND gate 116 includes input terminals 116a, 116b, and 116c, and output terminal 116d. Input terminal 115a of AND gate 115 is connected to output terminal 104b of filter 104. Input terminal 116a of AND gate is connected to terminal 102e of synchronizing signal generator 102 at which a signal of a frequency of 3.58 MHz appears. The output terminal 115d is connected to input terminal 105a of phase locked loop 105. The output terminal 116d is connected to input terminal 105b of phase locked loop 105. The crystal controlled, voltage controlled oscillator 106 has an input terminal 106a which is connected to the output terminal 105c of the phase locked loop 105 and output terminals 106b and 106c at which 14.3 MHz signals of zero reference phase and 180 degree, respectively, appear. Terminal 106b is connected to terminal 102c and terminal 106c is connected to terminal 102d of synchronizing signal generator 102. The flip-flop circuit 107 includes an input terminal 107a, an input terminal 107b and output terminals 107c and 107d. Input terminal 107a is connected to output terminal 101b of sync line detector 101. Input terminal 107b is connected to output terminal 102h of sync generator 102 at which horizontal drive pulses appear. In response to frame synchronization signal applied to terminal 107a and to horizontal drive signal from synchronizing signal generator 102, flip-flop 107 develops at output terminal 107c a signal shifting from a high level at even line intervals to a low level at odd line intervals at the line frequency rate. A first set of high levels occur during a first set of alternate lines and a second set of low levels occur during a second set of alternate lines. At output terminal 107d a signal is developed identical to the signal at 107c except shifted in phase by one line. A video selector switch 108 having a pole terminal 108a, a first contact terminal 108b and a second contact terminal 108c is provided. First contact terminal 108b is connected to terminal 107c, and second contact terminal 108c is connected to terminal 107d of the flip-flop circuit 107. A switch controller 109 is provided having an input terminal 109a and a linkage 109b connected to the pole of the switch 108 for controlling the position thereof to make contact with either the first contact terminal 108b or the second contact 108c in response to an appropriate control signal applied to the input terminal 109a. Thus, when switch 108 has its pole in a first position with the pole contacting first contact terminal 108b one set of signals alternating between a high and a low level at a line rate appears at pole terminal 108a. When the pole of switch 108 is in the second position, a second signal alternating between a high and a low level at line rate but shifted in phase by the period of one line is obtained. Accordingly, in one position the high levels are in synchronism with one set of alternate lines of detected video signal and in the other position the high levels of the signal are in synchronization with the other set of alternate lines of the detected video signal appearing at the output of the filter 104. Pole terminal 108a is connected to terminals 115b and 116b of AND gates 115 and 116. Terminal 102f of sync signal generator 102 providing a burst flag signal is connected to input terminals 115c and 116c of AND gates 115 and 116. Thus, when the switch 108 is in one position one set of color bursts are gated from one video signal into the input terminal 105a of the phased block loop 105. At the same time a 3.58 MHz signal from sync signal generator 102 is gated into input terminal 105b of the phase locked loop 105. When the switch 108 is in its other position the other set of color bursts are gated into input terminal 105a of the phase locked loop 105. Also, at the same time a 3.58 MHz signal from sync signal generator 105b is gated into terminal 105b of phase locked loop 105. The phase locked loop 105 thus is gated during the burst interval. During this interval the phase locked loop 105 compares the phase of the signal from the synchronization signal generator 102 applied to terminal 105b with the signal from filter 104 applied to terminal 105a and develops an output of one polarity at output terminal 105c if the phase departs from the phase of burst in one direction and develops a signal of the opposite polarity when the phase of the signal applied at terminal 105b departs in phase in the other direction from the phase of the burst. Accordingly, the phase of the oscillator 106 is changed to conform with the phase of the burst or color carrier signal of reference phase thereby providing at output terminal 102b a 3.58 MHz signal that is in phase with the burst signal of the particular set of alternate lines of the video signal selected for recovery by the system. The pole terminal 108a of switch 108 is also connected to the switch controller 96 which shifts the pole of switch 94 from one position to the other position at the line rate thereby interleaving the two sets of alternate lines of the desired video which is recovered at terminal 94a.

The video signal reconstitution subsystem 76 includes the synchornization signal and burst signal restoration circuit 111, a modulator or converter circuit 112, and a carrier generator 117. The synchronization signal and burst restoration signal includes input terminals 111a, 111b, 111c and an output terminal 111e. Input terminal 111a is connected to pole terminal 94a. Terminal 111b is connected to terminal 102e, terminal 111c is connected to terminal 102f and terminal 111d is connected to terminal 102g of sync signal generator 102. Output terminal 111e is connected to input terminal of modulator or up-converter 112. The synchronizing signal and burst restoration circuit combines the video signal selected for recovery by video selector switch 108 and applied to its input terminal 111a with the 3.58 MHz reference signal, the burst flag or gating signal and the composite sync signal from sync generator 102 to provide a complete television signal including luminance and chrominance components, horizontal and vertical synchronization signals, and color burst signals. The converter 112 encodes the complete color television signal onto a carrier of the desired frequency supplied to the converter by a carrier generator 117. The output of the converter 112 is connected to a conventional television receiver which converts the television signal into a picture.

Reference is now made to FIG. 7 which shows a block diagram of line decoder and waveform generator 43. In response to frame synchronization pulses obtained from frame detector 47 of FIG. 1 applied at terminal 43a, and horizontal drive pulses obtained from master synchronization generator 41 applied at terminal 43b, a voltage waveform is developed at terminal 43c which has a high level during the even lines of a frame and a low level during the odd lines of a frame and provides at output terminal 43d a voltage waveform which has a high level during the occurrence of line 265 of a frame and a low level at all other times. The generator 43 includes a ten stage counter 121, a read-only memory 122, a first delay type flip-flop 123 and a second delay type flip-flop 124. The ten stage counter 121 includes a terminal 121a for resetting the counter, a clock terminal 121b and an output terminal 121c. The output terminal 121c includes 10 lines on which binary coded words representing lines 1–525 occur in sequence in response to the horizontal drive pulses applied to the clock terminal 121b. The ROM or read-only memory 122 includes an input terminal 122a consisting of 10 lines representing the address lines of the ROM and output terminal 122b on which an output occurs at the beginning of each of the even lines of the frame and an output terminal 122c at which an output occurs at the beginning of line 265 of a frame. Input terminal 43a is connected to reset terminal 121a. Input terminal 43b is connected to clocking terminal 121b. Output terminal 121c of counter 121 is connected to input terminal 122a of ROM 122. The output terminal 122b of ROM 22 is connected to the input of type-D flip-flop 123, the output of which is connected to output terminal 43c. The output terminal 122c of ROM 122 is connected to the input of type-D flip-flop 124, the output of which is connected to output terminal 43d. The type D flip-flop 123 provides at its output a positive pulse of a duration of one line in response to a pulse applied at its input terminal. Type D flip-flop 124 develops a pulse or high level signal at its output terminal during the occurrence of line 265 of a frame in response to a pulse occurring at the beginning of line 265. The counter 121 is reset during the occurrence of a pulse at the output of frame detector 47 occurring at the beginning of a frame applied to reset terminal 121a. In response to horizontal drive pulses applied to the clock terminal 121b of the counter, counts of 1–525 occur at the output lines 121c. Each of the counts on output lines 121c addresses a particular location in the ROM 122. At the even line locations in ROM 122, a pulse is developed at output terminal 122b. At the address location of line 265 a pulse is developed at output terminal 122c in response to the pulses occurring at output terminal 122b. The type D flip-flop 123 develops a high level during the occurrence of each of the even lines. The type-D flip-flop 124 develops a high level output during the occurrence of line 265.

Figure 10A:
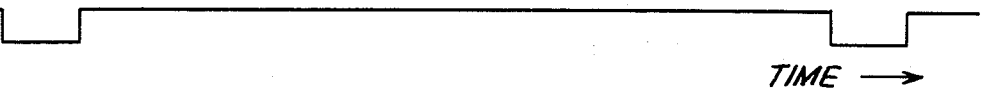
Figure 10B:
Figure 10C:
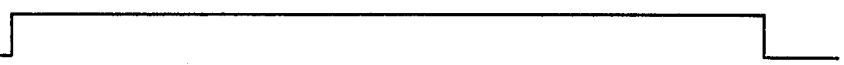
Figure 10D:
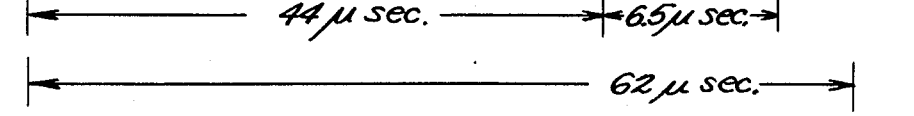

Reference is now made to FIG. 8 which shows a block diagram of the frame synchronization generator 44 of FIG. 1. The frame synchronization generator 44 includes input terminals 44a, 44b, 44c and output terminal 44d. At 14.32 MHz signal obtained from terminal 41b of master synchronization generator 41 is applied to terminal 44a. Line 265 signal from terminal 43d of line decoder 43, shown in FIG. 10B, is applied to terminal 44c. Horizontal drive signal obtained from terminal 41e of master synchronization generator 41, shown in FIG. 10A, is applied to terminal 44b. Frame synchronization signal shown in FIG. 10D is obtained at terminal 44d. The frame synchronization generator includes a trailing edge trigger flip-flop 131, an AND gate 132, a ten stage binary counter 133, a read only memory or ROM 134 and a digital-to-analog converter 135. The trailing edge trigger flip-flop 131 provides at its output the waveform shown in FIG. 10C in response to the horizontal drive pulse of FIG. 10A applied to its input. On the occurrence of the trailing edge of the horizontal drive signal of the FIG. 10A the output of the trailing edge flip-flop rises to a high level and remains there until the leading edge of the next horizontal drive pulse occurs at which time the output drops to a low level. The AND gate 132, in response to pulses of 14.32 MHz rate (not shown) appearing at terminal 44a, to the line 265 signal of FIG. 10B appearing at terminal 44c and to the output of the trailing-edge-trigger flip-flop 131 of FIG. 10C, provides at its output, pulses of 14.32 MHz frequency occurring during the occurrence of line 265 between the trailing edge of the horizontal drive pulse of that line and the leading edge of the horizontal drive pulse of line 266. The ten stage counter 133 after being reset by the horizontal drive pulse counts each of the pulses applied to the input terminal thereof by the AND gate 132. At its output the counter 113 develops over a eriod of time of 50.5 microseconds from the trailing edge of the horizontal drive pulse a total of 760 counts. Each of these counts addresses a location in ROM 134 at which is stored an 8 bit word representing the points on the waveform shown in FIG. 10D. Each point is spaced from an adjacent point by a time period of 70 nanoseconds. Each of the words in sequence are converted by the digital-to-analog converter 135 into samples of an analog signal as indicated in FIG. 10D. The count of the ten stage binary counter starts at the trailing edge of the horizontal drive pulse of line 265 which is the zero point 161 of the wave. Prior to this point in time, the signal is at blanking level. The waveform of FIG. 10D includes a portion containing 128 cycles of a 2.864 MHz sine wave included in an interval of 44 microseconds and a second portion of constant amplitude one-half the peak-to-peak amplitude of the sine wave for a period of 6.5 microseconds. During count 760 the level of the waveform drops to zero level and remains there until the occurrence of line 265 of the next frame of the video or television signal.

Figure 10E:
Figure 10F:
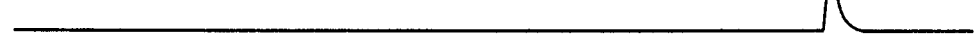
Figure 10G:
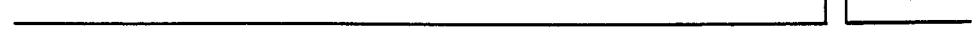

Reference is now made to FIG. 9 which shows the synchronizing line detector 101 of FIG. 2. The synchronizing line detector 101 includes an input terminal 101a and an output terminal 101b. Input terminal 101a is connected to the output terminal 78c of IF converter and video detector 78. At the output terminal 101b is obtained the frame synchronizing pulse shown in FIG. 10G marking the beginning of line 266 of a frame of a television or video signal. The synchronizing line detector 101 includes a circuit 141 for detecting the 2.864 MHz portion of the signal of the frame synchronizing signal of FIG. 10D, a circuit 142 for the detection of the trailing edge of the frame synchronizing signal of FIG. 10D and a circuit 143 for inhibiting the operation of circuit 142 during the occurrence of the 2.864 MHz signal of the frame synchronizing signal of FIG. 10D. The circuit 141 includes a parallel resonant circuit 145 tuned to the 2.864 MHz signal having a relatively high Q of about 100, an emitter follower stage 146, a detector 147, a comparator 148, and an AND gate 149. In response to the 2.864 MHz signal appearing at the terminal 101a, a voltage is developed across the capacitor of detector 147 rising in amplitude from zero amplitude at time zero of the synchronizing signal waveform to maximum amplitude occurring at point 162 of the 2.86 MHz waveform and thereafter decays at a rate determined by the time constant of the detector circuit 147. One of the input terminals of the comparator 148 is set at a particular reference level for clipping the output of the detector. Accordingly, at the output of the comparator 148, a waveform such as shown in FIG. 10E is obtained. During the occurrence of the 2.86 MHz signal the output rises from zero level to a high level, is maintained at that high level until the voltage at the output of the detector 147 decays to a value below the reference level. This latter level is set so that the high level at the output of the comparator is maintained beyond the horizontal drive pulse of line 266. The output of the comparator is supplied to one terminal of the AND gate 149. The circuit 142 includes a gating circuit including a diode 152 and a load resistor 153 connected in series. The diode 152 is poled to pass negative going edges of the signal coupled from terminal 101a through coupling capacitor 154 thereto. The edge detector circuit 142 also includes a differentiator 155 consisting of a capacitor 155a and a resistor 155b connected in series which differentiates the negative going edges of voltages appearing across resistors 153. The inverter 156 inverts the voltage developed across resistor 155b and produces a pulse such as shown in FIG. 10F occurring at time of occurrence of the trailing edge 163 of the waveform of FIG. 10D. The output of the inverter is applied to the other input of the AND gate 49 thereby producing at its output a pulse coincident with the trailing edge 163 of the waveform of FIG. 10D at output terminal 101b. A biasing or inhibiting circuit 143 provides a voltage to bias or inhibit the gate circuit 151 during the occurrence of the 2.864 MHz waveform of FIG. 10D. The circuit 143 includes a voltage doubler or detector 157 having an output load resistor 157a in parallel with a capacitor 157b. The input of the inhibiting circuit 157 is coupled to input terminal 101a through coupling capacitor 158. The output across capacitor 157b is connected to the cathode of diode 152 through resistor 159. The time constant of the circuit consisting of resistor 157a and capacitor 157b is set to be longer than one half the reciprocal of 2.864 MHz or longer than about 0.4 of a microsecond and shorter than about 6 microseconds. Thus, during the occurrence of the 2.86 MHz signal, a bias is developed across the capacitor 157b which maintains the cathode of diode 152 at a high level and accordingly nonconductive thereby inhibiting the action of the edge detection circuit 142 during the occurrence of these waves. After termination of the 2.86 MHz signal, the bias across the capacitor 157b decays rapidly and after a time period of about 6.5 microseconds representing the duration of the contant voltage portion of the waveform of FIG. 10D, it has decayed to a sufficiently low value to permit the trailing edge 163 of the waveform of FIG. 10D to be conducted through the gate circuit 151 thus enabling operation of the edge detection circuit 142. The function of the inhibiting or biasing circuit 143 is to insure detection of a falling edge only after the occurrence of the 2.86 MHz portion of the synchronizing signal of FIG. 10D.

While in the transmission station of FIG. 1 and the receiving station of FIG. 2, the switching functions required for reasons of simplicity of description have been implemented by mechanical switches such as switches 13, 14, 56, 94 and 108 operated by controllers 48, 49, 96 and 109 responsive to various pulse signals for the timing of the actuation of the switches, such assemblages can be completely implemented by field effect transistors appropriately connected and gated by the pulse signals, as is well known to those skilled in the art.

In the system of the present invention at the transmitting station the sequence of lines $l_1+l_2$, $l_3+l_4$, $l_5+l_6$, etc., and the sequence of lines $l_1-l_2$, $l_3-l_4$, $l_5-l_6$, etc., are formed for a first video signal. The sequence of lines $l_1'+l_2'$, $l_3'+l_4'$, $l_5'+l_6'$, etc., and the sequence of lines $l_1'-l_2'$, $l_3'-l_4'$ are also formed for a second video signal. The sequence of the sums of adjacent lines of the two video signals are interleaved into a resultant sum sequence and the sequence of the differences of adjacent lines of the two video signals are interleaved into a resultant difference signal. At the receiving station the resultant sum sequence is decomposed into its constituent sequences and the resultant difference sequence is decomposed into its constituent sequences. The sum sequence $l_1+l_2$, $l_3+l_4$, $l_5+l_6$, etc., and the difference sequence $l_1-l_2$, $l_3-l_4$, $l_5-l_6$, etc., of the first video signal are added to obtain the sequence $l_1$, $l_3$, $l_5$, etc. and are subtracted to obtain the sequence $l_2$, $l_4$, $l_6$, etc. The latter two sequences are combined to reconstitute the first video signal. Alternatively, the sum and difference sequences corresponding to the second video signal could have been processed to reconstitute the second video signal. This implementation of the invention is preferred for highest accuracy. The sequence $l_1$, $l_3$, $l_5$, etc. and the difference sequence $l_1-l_2$, $l_3-l_4$, $l_5-l_6$, etc. could as well have been formed at the transmitting stations for the first video signal and similar sequences formed for the second video signal. At the receiving station the two sequences of the first video signal could have been recovered in the same way. The addition of the two sequences would provide $l_1$, $l_3$, $l_5$, etc. and the subtraction of the two sequences would provide $l_2$, $l_4$, $l_6$, etc. Combining the latter two sequences would provide the reconstituted sequence $l_1$, $l_2$, $l_3$, $l_4$, $l_5$, $l_6$, etc. of the first video signal. This implementation of the invention is preferred for lowest cost.

While the two cases discussed above are preferred for reasons of accuracy and simplicity, respectively, any pair of linear combinations of the two image lines which are linearly independent could be chosen for transmission, with the appropriate inverse linear combinations being employed in the reconstruction thereof.

Since the eye has relatively poor resolution for chroma information, it is not actually necessary to use the average chrominance signals as indicated in FIG. 1. Instead, it is possible to use the chrominance signal from either one of the two lines, or it can be derived from the two chrominance signals in any other convenient way.

In the system of FIG. 1, the output of the carrier subsystem 16 is applied to a transmission channel. The transmission channel can be a recording media such as magnetic tape, in which case the signals can be recovered later and applied to the r-f tuner 77 of the receiving station 80 of FIG. 2. In this case the carrier generator 60 may operate at a lower frequency. The transmission channel can also be a cable television or a television broadcast channel.

In the embodiment of FIG. 1, a carrier wave of zero reference phase is modulated by the fifth composite signal after filtering and another carrier wave, the phase of which is shifted by 90 degrees from the phase of the zero reference phase carrier wave, is modulated by the sixth composite signal after filtering. The modulated carrier wave of zero reference phase and the modulated carrier wave of quadrature reference phase are combined to provide a single modulated carrier. In an alternative mode of formation of the single modulated carrier, a pair of carrier waves of zero reference phase and a pair of carrier waves of quadrature reference phase are provided. One carrier wave of zero reference phase is modulated by the first composite signal and one carrier wave of quadrature reference phase is modulated by the second composite signal. The other carrier wave of zero reference phase is modulated by the second composite signal and the other carrier wave of quadrature reference phase is modulated by the fourth composite signal. The carrier wave of zero reference phase modulated by the first composite signal and the carrier wave of quadrature reference phase modulated by the second composite signal are combined to provide a first resultant carrier. The other carrier wave of zero reference phase modulated by the third composite signal and the other carrier wave of quadrature reference phase modulated by the fourth composite signal are combined to provide a second resultant carrier. The first and second resultant carriers are interleaved to provide the single modulated carrier.

While the invention has been described in a specific embodiment, it will be understood that modifications, such as those described above, may be made by those skilled in the art and it is intended by the appended claims to cover all such modifications and changes as fall within the true spirit and scope of the invention.

What is claimed is:

1. In combination:
    means for providing a first luminance signal comprising a plurality of successive lines having a line scanning frequency of a first predetermined value, said plurality of lines consisting of a first set of alternate lines and a second set of alternate lines, each line having a duration of a first predetermined time, said first luminance signal having frequencies extending over a band of frequencies from zero frequency to a first predetermined frequency,
    means for forming a plurality of lines of a first composite signal, said plurality of lines of said first composite signal consisting of a first set of alternate lines and a second set of alternate lines, each line having a duration of said first predetermined time, each line of said first set of alternate lines of said first composite signal being a first linear combination of a respective line of said first set of alternate lines of said first luminance signal delayed by said first predetermined time and a respective successive line of said second set of alternate lines of said first luminance signal, each line of said second set of alternate lines of said first composite signal being zero,
    means for forming a plurality of lines of a second composite signal, said plurality of lines of a first set of alternate lines and a second set of alternate lines, each line having a duration of said first predetermined time, each line of said first set of alternate lines of said second composite signal being a second linear combination of a respective line of said first set of alternate lines of said first luminance signal delayed by said first predetermined time and a respective successive line of said second set of said first luminance signal, said second linear combination of said first luminance signal being independent of said first linear combination of said first luminance signal, each line of said second set of alternate lines of said second composite signal being zero,
    means for providing a second luminance signal comprising a plurality of successive lines having a line scanning frequency of said first predetermined value, said plurality of lines consisting of a first set of alternate lines and a second set of alternate lines, each line having a duration of said first predetermined time, said second luminance signal having frequencies extending over a band of frequencies from zero frequency to a first predetermined frequency,
    means for forming a plurality of lines of a third composite signal, said plurality of lines of said third composite signal consisting of a first set of alternate lines and a second set of alternate lines, each line having a duration of said first predetermined time, each line of said first set of alternate lines of said third composite signal being a third linear combination of a respective line of said first set of alternate lines of said second luminance signal delayed by said first predetermined time and a respective successive line of said second set of alternate lines of said second luminance signal, each line of said second set of said third composite signal being zero,
    means for forming a plurality of lines of a fourth composite signal, said plurality of lines of said fourth composite signal consisting of a first set of alternate lines and a second set of alternate lines, each line having a duration of said first predetermined time, each line of said first set of alternate lines of said fourth composite signal being a fourth linear combination of a respective line of said first set of alternate lines of said second luminance signal delayed by said first predetermined time and a respective successive line of said second set of alternate lines of said second luminance signal, said fourth linear combination of said second luminance signal being independent of said third linear combination of said third luminance signal, each line of said second set of said fourth composite signal being zero, means for interleaving the lines of said first set of alternate lines of said first composite signal and said first set of alternate lines of said third composite signal to provide a fifth composite signal, means for interleaving the lines of said first set of alternate lines of said second composite signal and said first set of alternate lines of said fourth composite signal to provide a sixth composite signal, means for filtering said fifth composite signal to provide a seventh composite signal having frequencies less than a second predetermined frequency, said second predetermined frequency being less than said first predetermined frequency, means for filtering said sixth composite signal to provide an eighth composite signal having frequencies less than a third predetermined frequency, said third predetermined frequency being substantially less than said second predetermined frequency, means for transmitting each of the lines of said seventh composite signal to a transmission channel, means for transmitting each of the lines of said eighth composite signal to said transmission channel.

2. The combination of claim 1 in which is provided means for generating a synchronizing signal, means for deleting one of the lines of one of said seventh and eighth composite signals and substituting therefor a line including said synchronizing signal, means for detecting said synchronizing signal, means responsive to said synchronizing signal for synchronizing the time of occurrence of each line of said recovered first luminance signal with the corresponding line of said first luminance signal.

3. The combination of claim 1 in which said first linear combination is an algebraic sum and in which said second linear combination is an algebraic difference of a line of said first set of alternate lines of said first luminance signal delayed by said first predetermined time and a successive line of said second set of alternate lines of said first luminance signal, and in which said third linear combination is an algebraic sum and in which said fourth linear combination is an algebraic difference of a line of said first set of alternate lines of said second luminance signal delayed by said first predetermined time and a successive line of said second set of alternate lines of said second luminance signal.

4. The combination of claim 3 in which the coefficient of one of the terms of said first linear combination is zero and in which the coefficient of one of the terms of said third linear combination is zero.

5. The combination of claim 3 in which is provided means for recovering said seventh composite signal and said eighth composite signal from said transmission channel, means for forming the sum of each line of a first set of alternate lines of said seventh composite signal and a respective line of said first set of alternate lines of said eighth composite signal to reconstitute a respective line of said first set of alternate lines of said first luminance signal, means for forming the difference of each line of said first set of alternate lines of said seventh composite signal and a respective line of said first set of alternate lines of said eighth composite signal to reconstitute a respective line of said second set of alternate lines of said first luminance signal, means for interleaving said first and second sets of alternate lines of said first luminance signal.

6. The combination of claim 5 in which said means for transmitting said seventh composite signal to said transmission channel includes modulating a first carrier wave in one phase with said seventh composite signal, and in which said means for transmitting said eighth composite signal to said transmission channel includes modulating said first carrier wave in quadrature phase with said eighth composite signal.

7. The combination of claim 6 in which means are provided for recovering said seventh composite signal and said eighth composite signal from said transmission channel, said means for recovering said seventh composite signal includes means for synchronously demodulating said first carrier wave modulated in said one phase by means of a second carrier wave of the same frequency as the frequency of said first carrier wave and of said one phase to obtain said seventh composite signal, said means for recovering said eighth composite signal includes means for synchronously demodulating said first carrier wave modulated in said quadrature phase by means of a second carrier wave of the same frequency as the frequency of said first carrier wave and of said quadrature phase to obtain said eighth composite signal.

8. The combination of claim 3 in which said transmission channel is a storage medium and in which is provided means for storing said seventh composite signal in said storage medium, means for storing said eighth composite signal in said storage medium, means for recovering said seventh composite signal and said eighth composite signal from said storage medium, means for forming the sum of each line of a first set of alternate lines of said seventh composite signal and a respective line of said first set of alternate lines of said eighth composite signal to reconstitute a respective line of said first set of alternate lines of said first luminance signal, means for forming the difference of each line of said first set of alternate lines of said seventh composite signal and a respective line of said second set of alternate lines of said eighth composite signal to reconstitute a respective line of said second set of alternate lines of said first luminance signal, means for interleaving said first and second sets of alternate lines of said first luminance signal.

9. The combination of claim 8 in which said storage medium is magnetic tape.

10. The combination of claim 3 in which said transmission channel is a broadcast channel and in which is provided, means for recovering said seventh composite signal and said eighth composite signal from said broadcast channel, means for forming the sum of each line of a first set of alternate lines of said seventh composite signal and a respective line of a second set of alternate lines of said eighth composite signal to reconstitute a respective line of said first set of alternate lines of said first luminance signal, means for forming the difference of each line of said first set of alternate lines of said seventh composite signal and a respective line of said second set of alternate lines of said eighth composite signal to reconstitute a respective line of said second set of alternate lines of said first luminance signal, means for interleaving said first and second sets of alternate lines of said first luminance signal.

11. In combination:

means for providing a first video signal comprising a plurality of successive lines having a line scanning frequency of a first predetermined value, said plurality of lines consisting of a first set of alternate lines and a second set of alternate lines, each line having a duration of a first predetermined time, said first video signal including a luminance component having frequencies extending over a band of frequencies from zero frequency to a first predetermined frequency, said frequencies being even multiples of one-half of said line scanning frequency, a first component consisting of sidebands of a subcarrier of one phase modulated in amplitude by a first color signal, and a second component consisting of side bands of said subcarrier of another phase modulated in amplitude by a second color signal, said other phase being in quadrature to said one phase, said subcarrier having a frequency which is situated at the upper end of said band of frequencies of said luminance component and which is an odd multiple of one-half of said line scanning frequency, means for forming a plurality of lines of a first composite signal, said plurality of lines of said first composite signal consisting of a first set of alternate lines and a second set of alternate lines, each line having a duration of said first predetermined time, each line of said first set of alternate lines of said first composite signal being a first linear combination of a respective line of said first set of alternate lines of said first video signal delayed by said first predetermined time and a respective successive line of said second set of alternate lines of said first video signal, each line of said second set of alternate lines of said first composite signal being zero, means for forming a plurality of lines of a second composite signal, said plurality of lines of said second composite signal consisting of lines of a first set of alternate lines and a second set of alternate lines, each line having a duration of said first predetermined time, each line of said first set of alternate lines of said second composite signal being a second linear combination of a respective line of said first set of alternate lines of said first video signal delayed by said first predetermined time and a respective successive line of said second set of said first video signal, said second linear combination of said first video signal being independent of said first linear combination of said first video signal, each line of said second set of alternate lines of said second composite signal being zero, means for providing a second video signal comprising a plurality of successive lines having a line scanning frequency of said first predetermined value, said plurality of lines consisting of a first set of alternate lines and a second set of alternate lines, each line having a duration of said first predetermined time, said second video signal including a luminance component having frequencies extending over a band of frequencies from zero frequency to said first predetermined frequency, said frequencies being even multiples of one-half of said line scanning frequency, a first component consisting of sidebands of a subcarrier of one phase modulated in amplitude by a first color signal, and a second component consisting of sidebands of said subcarrier of another phase modulated in amplitude by a second color signal, said other phase being in quadrature to said one phase, said subcarrier having a frequency which is situated at the upper end of said band of frequencies of said luminance component and which is an odd multiple of one-half of said line scanning frequency, means for forming a plurality of lines of a third composite signal, said plurality of lines of said third composite signal consisting of a first set of alternate lines and a second set of alternate lines, each line having a duration of said first predetermined time, each line of said first set of alternate lines of said third composite signal being a third linear combination of a respective line of said first set of alternate lines of said second video signal delayed by said first predetermined time and a respective successive line of said second set of alternate lines of said second video signal, each line of said second set of said third composite signal being zero, means for forming a plurality of lines of a fourth composite signal, said plurality of lines of said fourth composite signal consisting of a first set of alternate lines and a second set of alternate lines, each line having a duration of said first predetermined time, each line of said first set of alternate lines of said fourth composite signal being a fourth linear combination of a respective line of said first set of alternate lines of said second video signal delayed by said first predetermined time and a respective successive line of said second set of alternate lines of said second video signal, said fourth linear combination of said second video signal being independent of said third linear combination of said second video signal, each line of said second set of said fourth composite signal being zero, means for interleaving the lines of said first set of alternate lines of said first composite signal and said first set of alternate lines of said third composite signal to provide a fifth composite signal, means for interleaving the lines of said first set of alternate lines of said second composite signal and said first set of alternate lines of said fourth composite signal to provide a sixth composite signal, means for filtering said fifth composite signal to provide a seventh composite signal having frequencies less than a second predetermined frequency, said second predetermined frequency being less than said first predetermined frequency, means for filtering said sixth composite signal to provide an eighth composite signal having frequencies less than a third predetermined frequency, said third predetermined frequency being substantially less than said second predetermined frequency, means for filtering said sixth composite signal to provide a ninth composite signal having frequencies in a band extending from said second predetermined frequency to said third predetermined frequency, the difference of said first and second predetermined frequencies being a fraction of said first predetermined frequency, means for combining said ninth composite signal with said seventh composite signal to provide a tenth composite signal, means for transmitting each of the lines of said eighth composite signal to a transmission channel, means for transmitting each of the lines of said tenth composite signal to said transmission channel.

12. The combination of claim 11 in which said first predetermined frequency is about 4.2 MHz, said second predetermined frequency is about 3 MHz, and said third frequency is about 1.25 MHz.

13. The combination of claim 17 in which said first linear combination is an algebraic sum and in which said second linear combination is an algebraic difference of a line of said first set of alternate lines of said first video signal delayed by said first predetermined time and a successive line of said second set of alternate lines of said first video signal, and in which said third linear combination is an algebraic sum and in which said fourth linear combination is an algebraic difference of a line of said first set of alternate lines of said second video signal delayed by said first predetermined time and a successive line of said second set of alternate lines of said second video signal.

14. The combination of claim 13 in which said transmission channel is a storage medium and in which is provided:

means for storing said tenth composite signal in said storage medium, means for storing said eighth composite signal in said storage medium, means for recovering said eighth composite signal and said tenth composite signal from said storage medium, filter means for recovering said seventh composite signal and said ninth composite signal from said tenth composite signal, means for forming the sum of each line of a first set of alternate lines of said eighth composite signal and a respective line of a first set of alternate lines of said tenth composite signal to reconstitute a respective line of said first set of alternate lines of said first video signal, means for forming the difference of each line of said first set of alternate lines of said seventh composite signal and a respective sum of a respective line of said first set of alternate lines of said eighth composite signal and a respective line of said first set of alternate lines of said ninth composite signal to reconstitute a respective line of said second set of alternate lines of said first video signal, means for interleaving for said first and second sets of alternate lines of said first video signal.

15. The combination of claim 13 in which said transmission channel is a broadcast channel and in which is provided means for receiving said tenth composite signal from said broadcast channel, means for receiving said eighth composite signal from said broadcast channel, means for recovering said eighth composite signal and said tenth composite signal from said broadcast channel, filter means for recovering said seventh composite signal and said ninth composite signal from said tenth composite signal, means for forming the sum of each line of a first set of alternate lines of said eighth composite signal and a respective line of a first set of alternate lines of said tenth composite signal to reconstitute a respective line of said first set of alternate lines of said first video signal, means for forming the difference of each line of said first set of alternate lines of said seventh composite signal and a respective sum of a respective line of said first set of alternate lines of said eighth composite signal and a respective line of said first set of alternate lines of said ninth composite signal to reconstitute a respective line of said second set of alternate lines of said first video signal, means for interleaving said first and second sets of alternate lines of said first video signal.

16. The combination of claim 13 in which is provided, means for recovering said eighth composite signal and said tenth composite signal from said transmission channel, filter means for recovering said seventh composite signal and said ninth composite signal from said tenth composite signal, means for forming the sum of each line of a first set of alternate lines of said eighth composite signal and a respective line of a first set of alternate lines of said tenth composite signal to reconstitute a respective line of said first set of alternate lines of said first video signal, means for forming the difference of each line of said first set of alternate lines of said seventh composite signal and a respective sum of a respective line of said first set of alternate lines of said eighth composite signal and a respective line of said first set of alternate lines of said ninth composite signal to reconstitute a respective line of said second set of alternate lines of said first video signal, means for interleaving said first and second sets of alternate lines of said first video signal.

17. The combination of claim 16 in which said means for transmitting said tenth composite signal to said transmission channel includes modulating a carrier in one phase with said tenth composite signal, in which said means for transmitting said eighth composite signal to said transmission channel includes modulating said carrier in quadrature phase with said eighth composite signal, in which said means for recovering said tenth composite signal includes synchronously demodulating said modulated carrier to obtain said tenth composite signal, and in which said means for recovering said eighth composite signal includes synchronously demodulating said modulated carrier to obtain said eighth composite signal.

18. The combination of claim 16 in which each line of said first video signal includes a first burst signal of a first reference phase, each line of said second video signal includes a second burst signal of a second reference phase, whereby each of the lines of a first set of alternate lines of said fifth signal includes said first burst signal and each of the lines of a second set of alternate lines of said fifth signal includes said second burst signal, means for generating a signal of the same frequency as the frequency of said first burst signal, means responsive to the phase of said first burst signal for synchronizing the phase of said signal of burst frequency with the phase of said first burst signal.

19. The combination of claim 18 in which is provided, means for generating a synchronizing signal, means for deleting one of the lines of one of said seventh and eighth composite signals and substituting therefore a line including said synchronizing signal, means for detecting said synchronizing signal, means responsive to said synchronizing signal for synchronizing each line of said recovered first video signal with a respective line of said first video signal, means responsive to said synchronizing signal and to said signal of burst frequency for generating a composite synchronizing signal including horizontal and vertical synchronization signals and color burst signals occurring subsequent to horizontal synchronization signals, means for combining said composite synchronization signals and burst signals with said reconstituted first video signal.

* * * * *